United States Patent
Shimotsu et al.

(10) Patent No.: US 12,231,750 B2
(45) Date of Patent: Feb. 18, 2025

(54) IMAGING APPARATUS

(71) Applicant: FUJIFILM Corporation, Tokyo (JP)

(72) Inventors: Shinichi Shimotsu, Saitama (JP);
Masahiko Sugimoto, Saitama (JP);
Tetsuya Fujikawa, Saitama (JP);
Toshihiro Aoi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 196 days.

(21) Appl. No.: 17/885,553

(22) Filed: Aug. 11, 2022

(65) Prior Publication Data

US 2022/0385839 A1 Dec. 1, 2022

Related U.S. Application Data

(63) Continuation of application No. PCT/JP2021/002087, filed on Jan. 21, 2021.

(30) Foreign Application Priority Data

Feb. 21, 2020 (JP) .................................. 2020-028626

(51) Int. Cl.
*H04N 23/11* (2023.01)
*G01J 5/00* (2022.01)
(Continued)

(52) U.S. Cl.
CPC ................ *H04N 23/11* (2023.01); *G01J 5/48* (2013.01); *G02B 5/208* (2013.01); *G02B 26/007* (2013.01);
(Continued)

(58) Field of Classification Search
None
See application file for complete search history.

(56) References Cited

U.S. PATENT DOCUMENTS 6,175,113 B1 * 1/2001 Ashley ...................... G01J 5/53
250/252.1
2005/0029453 A1 * 2/2005 Allen ..................... H04N 23/23
250/332

(Continued)

FOREIGN PATENT DOCUMENTS

JP 2008070828 3/2008
JP 2008145270 6/2008

(Continued)

OTHER PUBLICATIONS

Steinberg et al., "A Reconstruction Method for the Estimation of Temperatures of Multiple Sources Applied for Nanoparticle-Mediated Hperthermia," Molecules, 23, 670, Mar. 16, 2018.*

(Continued)

*Primary Examiner* — Michael J Hess
(74) *Attorney, Agent, or Firm* — JCIPRNET

(57) ABSTRACT

An imaging apparatus includes an imaging optical system that has a light transmission characteristic of transmitting near-infrared light in a near-infrared light wavelength range including 1550 nm, and an imaging sensor that outputs an imaging signal by imaging the near-infrared light transmitted through the imaging optical system, the imaging sensor has sensitivity to heat radiation from a subject, and the imaging signal includes information regarding a heat radiation image by the heat radiation.

10 Claims, 18 Drawing Sheets

(51) Int. Cl.
  *G01J 5/48* (2022.01)
  *G02B 5/20* (2006.01)
  *G02B 26/00* (2006.01)
  *G03B 11/00* (2021.01)
(52) U.S. Cl.
  CPC ....... *G03B 11/00* (2013.01); *G01J 2005/0077* (2013.01)

(56) References Cited

U.S. PATENT DOCUMENTS

| | | | | |
|---|---|---|---|---|
| 2014/0139643 | A1* | 5/2014 | Hogasten | H01L 27/14685 |
| | | | | 348/48 |
| 2017/0066459 | A1* | 3/2017 | Singh | H04N 23/90 |
| 2018/0316859 | A1* | 11/2018 | Saenger Nayver | H04N 23/11 |
| 2019/0154602 | A1* | 5/2019 | Monnier | B01L 3/50851 |
| 2019/0183346 | A1* | 6/2019 | Islam | G01N 33/49 |
| 2019/0209000 | A1* | 7/2019 | Treado | A61B 1/0646 |
| 2020/0049632 | A1 | 2/2020 | Weinstein et al. | |
| 2020/0076149 | A1* | 3/2020 | Papp | G02F 1/0344 |
| 2021/0239955 | A1* | 8/2021 | Dai | G01N 21/6458 |
| 2021/0270733 | A1* | 9/2021 | Van Hoof | G01J 3/0205 |

FOREIGN PATENT DOCUMENTS

| | | |
|---|---|---|
| JP | 2012054904 | 3/2012 |
| JP | 2017026362 | 2/2017 |
| JP | 2018151354 | 9/2018 |
| JP | 2018179932 | 11/2018 |

OTHER PUBLICATIONS

Cohen et al., "Room Temperature InGaAs camera for NIR imaging," SPIE Vo. 1946 Infrared Detectors and Instrumentation, (1993).*

"International Search Report (Form PCT/ISA/210) of PCT/JP2021/002087," mailed on Apr. 20, 2021, with English translation thereof, pp. 1-7.

"Written Opinion of the International Searching Authority (Form PCT/ISA/237)" of PCT/JP2021/002087, mailed on Apr. 20, 2021, with English translation thereof, pp. 1-10.

"Office Action of Japan Counterpart Application" with English translation thereof, issued on Jun. 6, 2023, p. 1-p. 5.

* cited by examiner

COMPARATIVE EXAMPLE

IMAGING APPARATUS

CROSS-REFERENCE TO RELATED APPLICATION

This application is a continuation application of International Application No. PCT/JP2021/002087, filed Jan. 21, 2021, the disclosure of which is incorporated herein by reference in its entirety. Further, this application claims priority from Japanese Patent Application No. 2020-028626 filed on Feb. 21, 2020, the disclosure of which is incorporated herein by reference in its entirety.

BACKGROUND

1. Technical Field

A technique of the present disclosure relates to an imaging apparatus.

2. Description of the Related Art

A technique described in JP2008-145270A provides a thermography apparatus with a simple structure in which an infrared image and a visible image do not generate parallax. In the thermography apparatus described in JP2008-145270A, a camera having sensitivity to a visible light wavelength and a camera having sensitivity to an infrared light wavelength are disposed crossing an optical axis C1 and an optical axis C2, and a moving chopper one surface of which on an object O to be measured is a mirror surface and that has a light transmission hole is provided on a straight optical axis C1 from one camera between the two cameras toward the object O to be measured. The moving chopper is disposed such that a reflection optical path by the mirror surface of the moving chopper coincides with the optical axis C2 of the other camera between the two cameras.

SUMMARY

An embodiment of the technique of the present disclosure provides an imaging apparatus that enables acquisition of a heat radiation image in addition to a near-infrared subject image.

To achieve the above-described object, there is provided an imaging apparatus of the present disclosure comprising an imaging optical system that has a light transmission characteristic of transmitting near-infrared light in a near-infrared light wavelength range including 1550 nm, and an imaging sensor that outputs an imaging signal by imaging the near-infrared light transmitted through the imaging optical system, in which the imaging sensor has sensitivity to heat radiation from a subject, and the imaging signal includes information regarding a heat radiation image by the heat radiation.

It is preferable that the imaging signal includes information regarding both a subject image captured by the near-infrared light and the heat radiation image by the heat radiation.

It is preferable that the imaging optical system has a plurality of lenses, a coating layer having the light transmission characteristic is formed on at least one lens, and the light transmission characteristic has a transmittance peak within the near-infrared light wavelength range.

It is preferable that the light transmission characteristic indicates that, in the near-infrared light wavelength range, light transmittance on a short wavelength side with respect to a near-infrared light peak wavelength range including 1550 nm decreases from light transmittance at a short wavelength end of the near-infrared light peak wavelength range as a wavelength decreases, and light transmittance on a long wavelength side with respect to the near-infrared light peak wavelength range decreases from light transmittance at a long wavelength end of the near-infrared light peak wavelength range as the wavelength increases.

It is preferable that the light transmission characteristic indicates that light transmittance in the near-infrared light peak wavelength range is equal to or greater than 60%.

It is preferable that the light transmission characteristic indicates that a light transmission bandwidth centering on 1550 nm is equal to or less than 200 nm.

It is preferable that the imaging apparatus further comprises a band-pass filter having the light transmission bandwidth, and the imaging sensor images the near-infrared light transmitted through the imaging optical system and the band-pass filter.

It is preferable that the imaging apparatus further comprises a light source that emits the near-infrared light, a light source drive controller that applies temporal modulation to intensity or a frequency of the near-infrared light emitted from the light source with drive of the light source, and an image processing unit that generates first image data representing a subject image by the near-infrared light and second image data representing the heat radiation based on a direct-current component and a modulated component of the imaging signal.

It is preferable that the image processing unit generates the first image data based on the modulated component and generates the second image data based on the direct-current component.

It is preferable that the imaging optical system has a light transmission characteristic of transmitting the near-infrared light and transmitting visible light in a visible light wavelength range.

In this case, it is preferable that the imaging sensor has sensitivity to the visible light, the imaging apparatus further comprises a switchable filter that selectively transmits the near-infrared light and the visible light, and the imaging sensor selectively images the near-infrared light and the visible light transmitted through the imaging optical system and the filter.

It is preferable that the imaging apparatus further comprises an image processing unit that generates near-infrared image data based on the imaging signal output by imaging the near-infrared light with the imaging sensor, generates visible image data based on the imaging signal output by imaging the visible light with the imaging sensor, and generates image data representing the heat radiation image by subtracting the visible image data from the near-infrared image data.

It is preferable that the imaging optical system has a plurality of lenses, a coating layer having the light transmission characteristic is formed on at least one lens, and the light transmission characteristic has a low light transmittance range where light transmittance is lower than light transmittance to the near-infrared light and the visible light, between the near-infrared light wavelength range and the visible light wavelength range.

It is preferable that the imaging optical system has a zoom function.

It is preferable that the imaging sensor is an InGaAs imaging element.

It is preferable that the imaging apparatus further comprises a stop that adjusts an amount of incident light on the imaging sensor.

BRIEF DESCRIPTION OF THE DRAWINGS

Exemplary embodiments according to the technique of the present disclosure will be described in detail based on the following figures, wherein.

DETAILED DESCRIPTION

An example of an embodiment according to the technique of the present disclosure will be described following the accompanying drawings.

First, terms that are used in the following description will be described.

In the following description, "LED" is an abbreviation for "Light Emitting Diode". "ND" is an abbreviation for "Neutral Density". "CPU" is an abbreviation for "Central Processing Unit". "ROM" is an abbreviation for "Read Only Memory". "DVD-ROM" is an abbreviation for "Digital Versatile Disc-Read Only Memory". "RAM" is an abbreviation for "Random Access Memory". "I/F" is an abbreviation for "Interface". "HDD" is an abbreviation for "Hard Disk Drive". "EEPROM" is an abbreviation for "Electrically Erasable Programmable Read Only Memory". "FPGA" is an abbreviation for "Field-Programmable Gate Array". "PLD" is an abbreviation for "Programmable Logic Device". "ASIC" is an abbreviation for "Application Specific Integrated Circuit". "SSD" is an abbreviation for "Solid State Drive". "USB" is an abbreviation for "Universal Serial Bus".

First Embodiment

Figure 1:
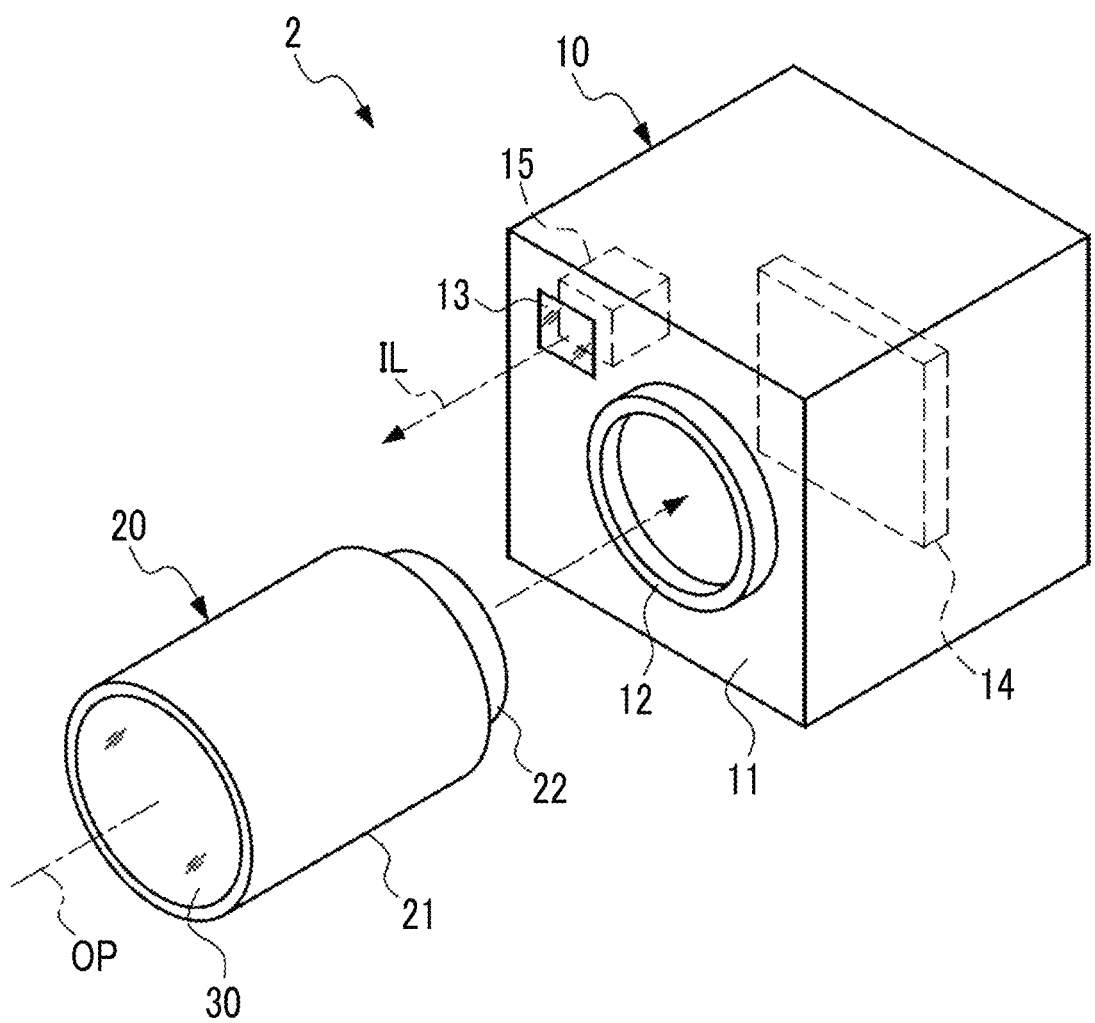
FIG. 1 is a schematic perspective view showing the configuration of a camera that is an example of an imaging apparatus.

FIG. 1 shows the configuration of a camera 2 that is an example of an imaging apparatus. The camera 2 of the present embodiment is configured with a camera body 10 and a lens unit 20. The camera 2 enables imaging (hereinafter, referred to as "visible imaging") using visible light and imaging (hereinafter, referred to as "near-infrared imaging") using near-infrared light. In an image obtained by the near-infrared imaging, a subject image (hereinafter, referred to as a "near-infrared subject image") by reflection of near-infrared light from a subject, and heat radiation image by heat radiation from the subject are included.

In a front surface 11 of the camera body 10, a camera-side mount 12 for attachment of the lens unit 20 is provided. In the front surface 11 of the camera body 10, an irradiation window 13 that is provided for irradiation of illumination light IL toward the subject is provided.

Inside the camera body 10, a light source 15 that generates the illumination light IL is provided. The light source 15 is, for example, an LED that emits near-infrared light having a peak wavelength of 1550 nm as the illumination light IL. The illumination light IL generated by the light source 15 is transmitted through the irradiation window 13 and is emitted outside the camera body 10. Inside the camera body 10, an imaging sensor 14 is provided. The imaging sensor 14 images light incident through the lens unit 20. The imaging sensor 14 is disposed at a predetermined position inside the camera body 10 through a holder (not shown).

The imaging sensor 14 is an imaging element that has detection performance capable of detecting light in a wide wavelength range of a visible light wavelength range to a near-infrared light wavelength range. The imaging sensor 14 is, for example, an InGaAs imaging element that can detect light in a wavelength range of 500 nm to 1700 nm. The imaging sensor 14 has sensitivity to heat radiation from the subject. The heat radiation to which the imaging sensor 14 has sensitivity is an electromagnetic wave in a near-infrared range emitted from the subject at about 200° C. or higher.

In an imaging surface 14A of the imaging sensor 14, for example, pixels having a pixel size of 15 μm are arranged in a matrix. The number of pixels is, for example, 640×480.

The lens unit 20 is configured with a lens barrel 21 and a lens-side mount 22. The lens-side mount 22 is provided in a proximal end portion of the lens barrel 21. The lens-side mount 22 is configured to be connectable to the camera-side mount 12 of the camera body 10. In the present example, although the lens unit 20 is attachable to and detachable from the camera body 10, the lens unit 20 may be connected to the camera body 10 not to be attachable and detachable.

Figure 2:
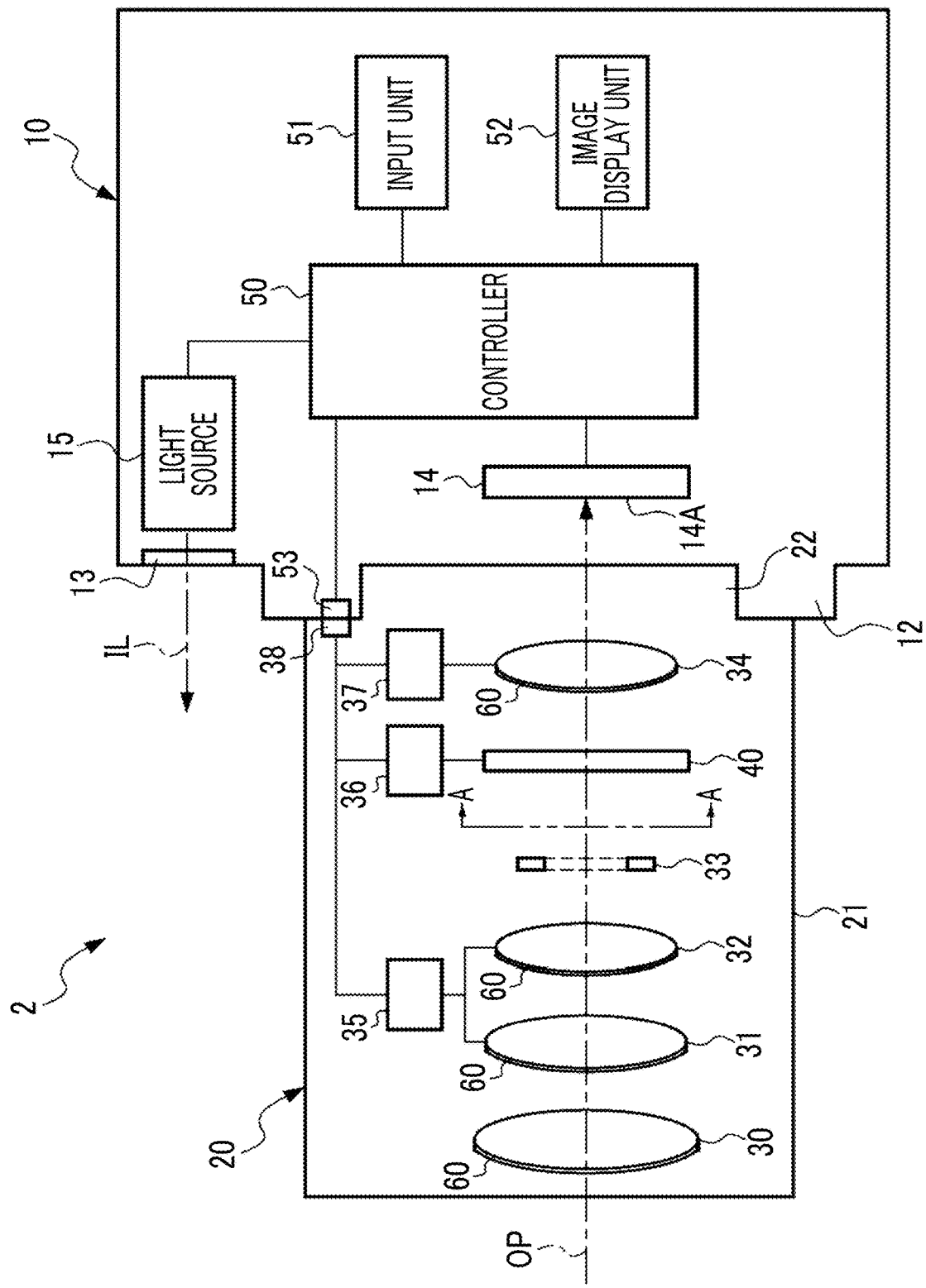
FIG. 2 is a schematic view showing the internal configuration of the camera.

FIG. 2 shows the internal configuration of the camera 2 in a state in which the lens unit 20 is connected to the camera body 10. The lens unit 20 is a telephoto lens that has an imaging optical system configured with a plurality of lenses and the like. The lens unit 20 comprises, from an objective side toward an image formation side, an objective lens 30, a focus lens 31, a zoom lens 32, a stop 33, a turret filter 40, and an adjustment lens 34. The lens unit 20 forms an optical image of the subject on the imaging surface 14A of the imaging sensor 14 with a plurality of lenses.

The objective lens 30, the focus lens 31, the zoom lens 32, the stop 33, the turret filter 40, and the adjustment lens 34 are an example of an "imaging optical system" according to the technique of the present disclosure. The lens unit 20 is not limited to the above-described optical elements, and may include optical elements, such as a half mirror or a polarizer.

Inside the lens unit 20, a zoom lens drive mechanism 35, a turret drive mechanism 36, and an adjustment lens drive mechanism 37 are provided. The zoom lens drive mechanism 35, the turret drive mechanism 36, and the adjustment lens drive mechanism 37 are electrically connected to the camera body 10 through an electric contact 38 provided in a rear end portion of the lens barrel 21.

Inside the camera body 10, the imaging sensor 14, the light source 15, a controller 50, an input unit 51, and an image display unit 52. The controller 50 is electrically connected to the lens unit 20 through an electric contact 53 provided in the camera-side mount 12. The electric contact 53 of the camera body 10 is brought into contact with the electric contact 38 of the lens unit 20, whereby the controller 50 is electrically connected to the zoom lens drive mechanism 35, the turret drive mechanism 36, and the adjustment lens drive mechanism 37.

Each of the zoom lens drive mechanism 35, the turret drive mechanism 36, and the adjustment lens drive mechanism 37 is a drive mechanism that includes an actuator, such as a motor. The zoom lens drive mechanism 35, the turret drive mechanism 36, and the adjustment lens drive mechanism 37 may be disposed inside the camera body 10.

The imaging optical system included in the lens unit 20 has a light transmission characteristic of transmitting near-infrared light in a near-infrared light wavelength range including at least 1550 nm. The light transmission characteristic is realized by a coating layer 60 formed on a surface of each lens of the objective lens 30, the focus lens 31, the zoom lens 32, and the adjustment lens 34. The coating layer 60 may be provided in at least one lens among a plurality of lenses included in the imaging optical system.

Though details will be described below, in the present embodiment, the coating layer 60 has high light transmittance in a specific wavelength range of visible light and near-infrared light (see FIG. 14). For example, the coating layer 60 has high transmittance in a wavelength range equal to or higher than 1300 nm of a near-infrared light wavelength range (800 nm to 3000 nm). The coating layer 60 has high transmittance in a visible light wavelength range (400 nm to 800 nm).

In a case where an imaging optical system that has a light transmission range over a wide wavelength range from the visible light wavelength range to the near-infrared light wavelength range is provided, conversely, high light transmittance is not obtained in the wide wavelength range. In this case, brightness of an image obtained through the near-infrared imaging may not reach a level requested by a user. As a result, the resolution of the image may be lowered with respect to a level requested by the user.

The coating layer 60 having the light transmission characteristic described above, whereby it is possible to increase light transmittance in a specific wavelength range compared to an imaging optical system having a wide light transmission range. For example, transmittance in a wavelength range of 800 nm to 1300 nm is decreased, whereby it is possible to increase light transmittance in a wavelength range including 1550 nm. As a result, it is possible to obtain an image the brightness and the resolution of which satisfy the requested levels of the user.

The objective lens 30 is fixed to the lens barrel 21 that holds each optical element, such as a lens, and collects light from the subject.

The focus lens 31 is an optical system that is provided to adjust a focusing position of the optical image. The zoom lens 32 is an optical system that is provided to adjust a zoom magnification. The focus lens 31 and the zoom lens 32 moves forward and backward along an optical axis OP of the lens unit 20 in conjunction with each other by a cam mechanism (not shown). With this, a zoom function and a focus function are realized, and the zoom magnification and the focusing position are adjusted.

The focus lens 31 and the zoom lens 32 are driven by rotating a zoom cam (not shown) by the zoom lens drive mechanism 35. The zoom lens drive mechanism 35 is controlled by the controller 50 in response to an instruction given to the input unit 51 from the user.

The stop 33 is an optical element that narrows luminous flux by blocking unnecessary light, such as stray light. That is, the stop 33 adjusts an amount of incident light on the imaging sensor 14. An opening of the stop 33 is adjusted by the user using a stop ring (not shown) provided on an outer periphery of the lens barrel 21. In the present embodiment, although the stop 33 is disposed between the zoom lens 32 and the turret filter 40, a position of the stop 33 is not limited thereto. For example, the stop 33 may be disposed to be movable between the focus lens 31 and the zoom lens 32.

Figure 3:
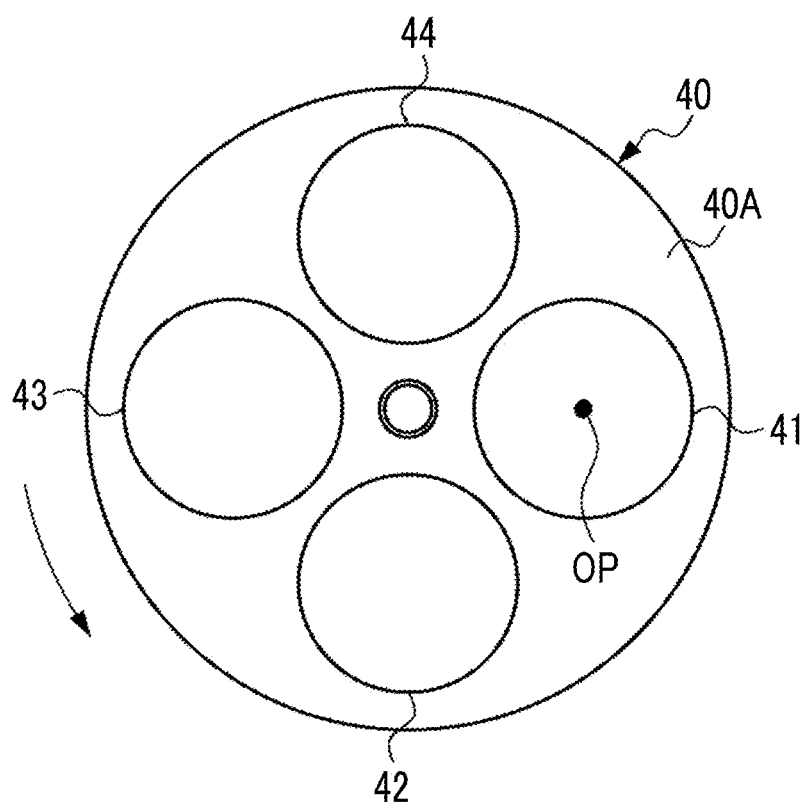
FIG. 3 is a schematic view of a turret filter viewed from an A-A direction of FIG. 2.

The turret filter 40 is an example of a switchable filter that selectively transmits the near-infrared light and the visible light. As shown in FIG. 3, the turret filter 40 is a rotary filter in which a first optical filter 41, a second optical filter 42, a third optical filter 43, and a fourth optical filter 44 are disposed on a circular plate 40A.

The turret filter 40 is configured that the circular plate 40A is rotationally driven by the turret drive mechanism 36. With this, any optical filter of the first optical filter 41, the second optical filter 42, the third optical filter 43, and the fourth optical filter 44 is disposed on the optical axis OP.

To detect the optical filter that is disposed on the optical axis OP, a sensor (not shown) that detects a rotation position of the circular plate 40A is provided. The sensor may be provided in the turret drive mechanism 36. The turret drive mechanism 36 is controlled by the controller 50 in response to an instruction given to the input unit 51 from the user. The sensor that detects the rotation position of the circular plate 40A is configured with a rotary encoder or the like.

In the present embodiment, although the turret filter 40 is disposed between the stop 33 and the adjustment lens 34, a position of the turret filter 40 is not limited thereto. The turret filter 40 may be disposed at any position on the optical axis OP in the lens unit 20. The turret filter 40 may be disposed in the camera body 10.

The first optical filter 41 is a band-pass filter that transmits visible light. For example, the first optical filter 41 is a band-pass filter that transmits visible light in a visible light peak wavelength range VIS (see FIGS. 14 and 15) described below. The visible light peak wavelength range VIS is, for example, a wavelength range of 450 nm to 700 nm. In a case where the visible imaging is performed, the first optical filter 41 is disposed on the optical axis OP.

The second optical filter 42 is a band-pass filter that transmits near-infrared light. For example, the second optical filter 42 is a band-pass filter that transmits near-infrared light in a near-infrared light peak wavelength range NIR (see FIGS. 14 and 15) described below. The near-infrared light peak wavelength range NIR is, for example, a wavelength range of 1450 nm to 1650 nm. That is, for example, the second optical filter 42 is a band-pass filter where a light transmission bandwidth centering on 1550 nm is 200 nm. In a case where the near-infrared imaging is performed, the second optical filter 42 is disposed on the optical axis OP.

The third optical filter 43 is a transparent glass plate, and has a refractive index close to a refractive index of each optical filter of the first optical filter 41, the second optical filter 42, and the fourth optical filter 44. The third optical filter 43 is a filter for optical path length adjustment that adjusts an optical path length to match an optical path length in a case where the first optical filter 41, the second optical filter 42, and the fourth optical filter 44 are used.

The fourth optical filter 44 is an ND filter for light amount adjustment that reduces an amount of incident light on the imaging sensor 14.

A focal length in visible light that is transmitted through the first optical filter 41 is shorter than a focal length in near-infrared light that is transmitted through the second optical filter 42. To correct a difference in focal length, an ND value of the first optical filter 41 is set to a value greater than an ND value of the second optical filter 42. The ND value is a product of a refractive index and a thickness, and represents an optical path length.

With this configuration, it is possible to reduce deviation between a focusing position for visible light and a focusing position for near-infrared light. Although deviation in focusing position between visible light and near-infrared light is also adjusted by the adjustment lens 34 described below, the adjustment based on the ND value is particularly useful in a case where adjustment cannot be sufficiently made with the adjustment lens 34.

The adjustment lens 34 is a lens that is provided to adjust a difference in focal length in a case where the first optical filter 41 and the second optical filter 42 are switched. As described above, in the near-infrared light having a wavelength longer than the visible light, the focal length is longer than the focal length of the visible light. Since the focus lens 31 and the zoom lens 32 are configured to adjust the focusing position for the visible light at the time of variable magnification to match the imaging surface 14A of the imaging sensor 14, it is not possible to accurately adjust the focusing position for the near-infrared light. For this reason, the position of the adjustment lens 34 is adjusted such that the focusing position matches the imaging surface 14A at the time of the near-infrared imaging that is performed with the second optical filter 42 disposed on the optical axis OP.

The adjustment lens 34 is driven by the adjustment lens drive mechanism 37. The adjustment lens drive mechanism 37 is controlled by the controller 50 in a response to an instruction from the user. Specifically, the controller 50 controls the adjustment lens drive mechanism 37 depending on imaging conditions instructed by the user through the input unit 51. Here, the imaging conditions include, for example, selection information regarding whether to execute the visible imaging or the near-infrared imaging, and selection information of the zoom magnification. A focusing position of the adjustment lens 34 means a position of the adjustment lens 34 for forming an image of light on the imaging surface 14A of the imaging sensor 14 in a focused state.

The controller 50 may detect a type of an optical filter disposed on the optical axis OP based on rotation position information obtained by the sensor provided in the turret filter 40, and then, may adjust the position of the adjustment lens 34 based on focusing position data described below. For example, in a case where the execution of the visible imaging is instructed by the user through the input unit 51, the first optical filter 41 is disposed on the optical axis OP by the controller 50. In a case where the execution of the near-infrared imaging is instructed to the controller 50 by the user through the input unit 51, the second optical filter 42 is disposed on the optical axis OP. The controller 50 detects the type of the optical filter disposed on the optical axis OP with the above-described sensor and performs position adjustment of the adjustment lens 34 based on the detected type of the optical filter. The adjustment lens 34 can also be used for adjustment of back focus in a case where the camera body 10 is replaced.

Figure 4:
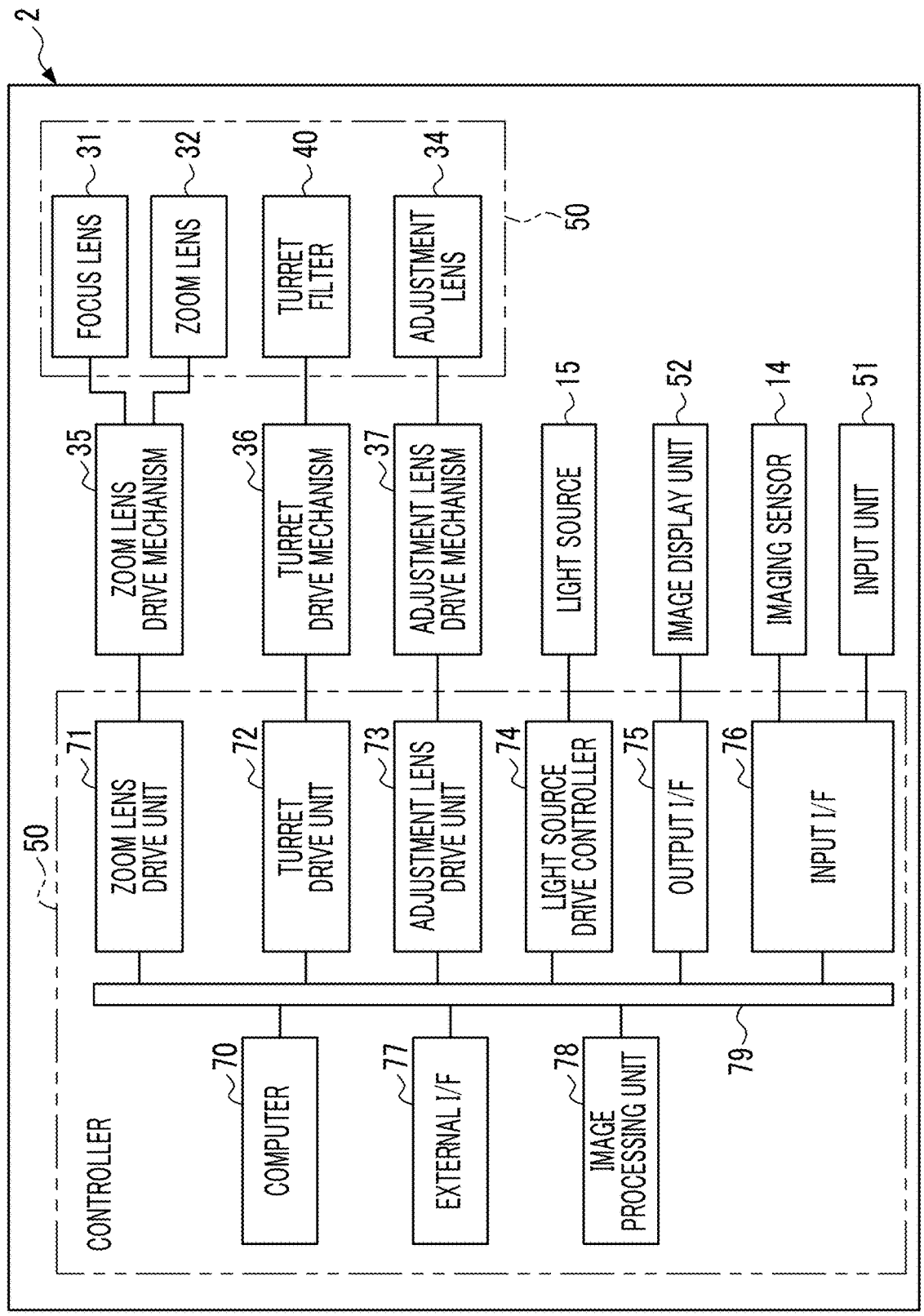
FIG. 4 is a block diagram showing the configuration of a controller.

FIG. 4 shows the configuration of the controller 50. The controller 50 includes a computer 70, a zoom lens drive unit 71, a turret drive unit 72, an adjustment lens drive unit 73, a light source drive controller 74, an output I/F 75, an input I/F 76, an external I/F 77, and an image processing unit 78. Such units are connected through a bus line 79. The computer 70 integrally controls the respective units in the controller 50.

The zoom lens drive unit 71 is connected to the zoom lens drive mechanism 35. The turret drive unit 72 is connected to the turret drive mechanism 36. The adjustment lens drive unit 73 is connected to the adjustment lens drive mechanism 37. The light source drive controller 74 is connected to the light source 15. The output I/F 75 is connected to the image display unit 52. The input I/F 76 is connected to the imaging sensor 14 and the input unit 51.

The image display unit 52 displays an image based on image data input from the image processing unit 78 through the output I/F 75. The input unit 51 receives an instruction given from the user. The input I/F 76 is an interface that receives an imaging signal from the imaging sensor 14 and a command signal from the input unit 51, and transmits the imaging signal and the command signal to the computer 70. The image processing unit 78 generates image data by executing various kinds of image processing on the imaging signal output from the imaging sensor.

The zoom lens drive unit 71 adjusts the position of the focus lens 31 and the position of the zoom lens 32 by controlling the zoom lens drive mechanism 35 following an instruction of the computer 70. The turret drive unit 72 switches the optical filter of the turret filter 40 by controlling the turret drive mechanism 36 following an instruction of the computer 70. The adjustment lens drive unit 73 adjusts the position of the adjustment lens 34 by controlling the adjustment lens drive mechanism 37 following an instruction of the computer 70.

The light source drive controller 74 drives and controls the light source 15 following an instruction of the computer 70. The computer 70 gives an instruction to the light source drive controller 74 to drive the light source 15 in a case where the execution of the near-infrared imaging is instructed by the user through the input unit 51. In the present embodiment, the light source drive controller 74 applies temporal modulation to the intensity of the near-infrared light emitted from the light source 15 by modulating and driving the light source 15.

The output I/F 75 is an interface that sends an image display signal based on image data obtained through the image processing with the image processing unit 78 to the image display unit 52.

The optical image formed by the imaging optical system of the lens unit 20 is converted into the imaging signal by the imaging sensor 14, various kinds of image processing are executed on the imaging signal, and then, an image is displayed on the image display unit 52 described below. The image subjected to the image processing may be transmitted outside the camera 2 in a wired or wireless manner.

Figure 5:
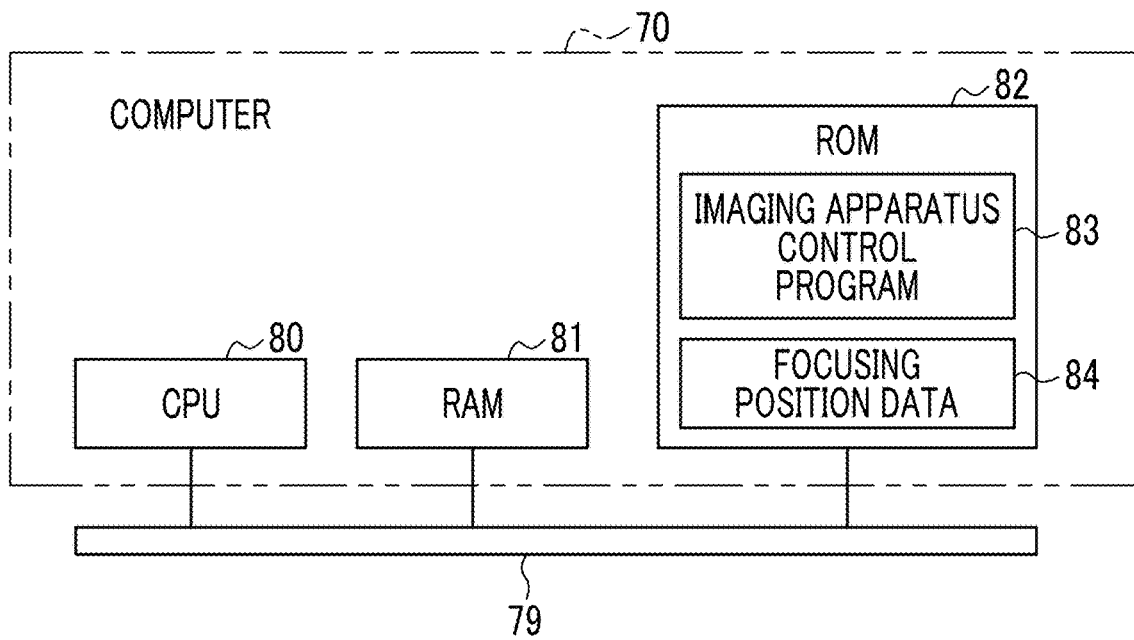
FIG. 5 is a block diagram showing the configuration of a computer.

FIG. 5 shows the configuration of the computer 70. The computer 70 has a CPU 80, a RAM 81, and a ROM 82 connected by a bus line 79. The CPU 80 controls the entire camera 2. The RAM 81 is, for example, a volatile memory that is used as a work memory or the like at the time of execution of an imaging apparatus control program. The ROM 82 is a nonvolatile memory that stores an imaging apparatus control program 83 for controlling the camera 2, focusing position data 84, and the like. In the present embodiment, although the computer 70 is configured with one CPU, the computer may be configured with a plurality of CPUs.

The CPU 80 reads the imaging apparatus control program 83 from the ROM 82 and develops the reads imaging apparatus control program 83 to the RAM 81. Then, the CPU 80 executes the imaging apparatus control program 83 to control the zoom lens drive unit 71, the turret drive unit 72, the adjustment lens drive unit 73, and the light source drive controller 74.

The focusing position data 84 is data in which the position of the adjustment lens 34 in a case where the visible imaging is executed and the position of the adjustment lens 34 in a case where the near-infrared imaging is executed are associated with the zoom magnification. This is because the difference in focusing position between a case where the visible imaging is executed and a case where the near-infrared imaging is executed changes depending on the zoom magnification. As described above, a case where the visible imaging is executed refers to a case where the first optical filter 41 is disposed on the optical axis OP to image the visible light. A case where the near-infrared imaging is executed refers to a case where the second optical filter 42 is disposed on the optical axis OP to image the near-infrared light. The focusing position data 84 is stored as, for example, position data in which the position of the adjustment lens 34 is associated with each zoom magnification that can be set in a case of the visible imaging and a case of the near-infrared imaging.

Figure 6:
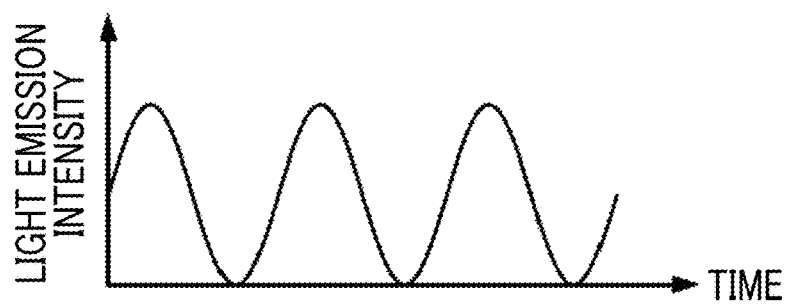
FIG. 6 is a graph showing an intensity waveform of illumination light.

FIG. 6 shows an intensity waveform of the illumination light IL that is emitted from the light source 15. As described above, the illumination light IL is, for example, near-infrared light having a peak wavelength of 1550 nm. The light source 15 is modulated and driven by the light source drive controller 74 to emit near-infrared light the luminescence intensity of which changes with time, as the illumination light IL. The intensity waveform of the illumination light IL is, for example, a sine wave shape. The intensity waveform of the illumination light IL is not limited to the sine wave shape, and may be other waveforms, such as a rectangular pulse shape.

Figure 7:
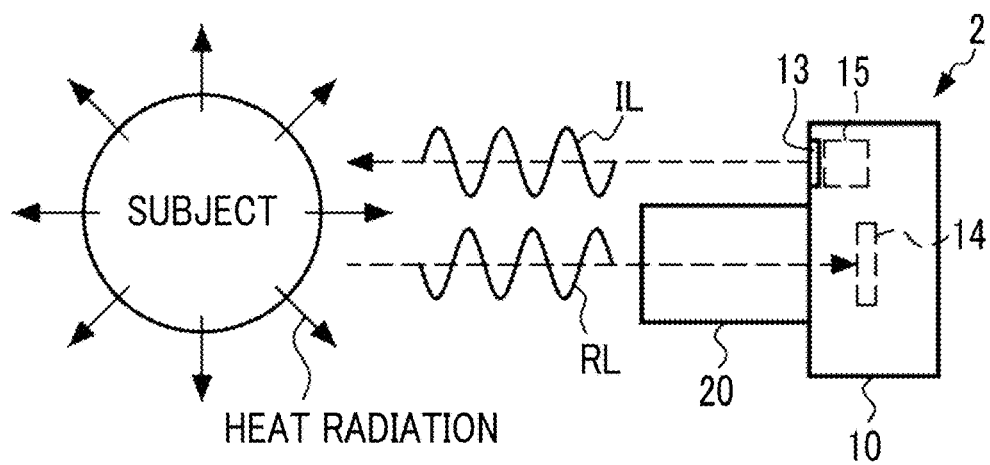
FIG. 7 is a diagram illustrating illumination light, reflected light, and heat radiation.

As shown in FIG. 7, the illumination light IL emitted from the light source 15 of the camera 2 is transmitted through the irradiation window 13 and illuminates the subject. A part of the illumination light IL is reflected by the subject and is directed in a direction of the camera 2 as reflected light RL. In the reflected light RL, intensity modulation of the illumination light IL is maintained.

In the subject, heat radiation depending on a temperature of the subject is generated. In addition to the reflected light RL, light by the heat radiation is incident on the lens unit 20, and a near-infrared light component is transmitted through the second optical filter 42 and is incident on the imaging surface 14A of the imaging sensor 14. Accordingly, the imaging signal that is output from the imaging sensor 14 includes information regarding both a near-infrared subject image and a heat radiation image by the heat radiation.

Figure 8:
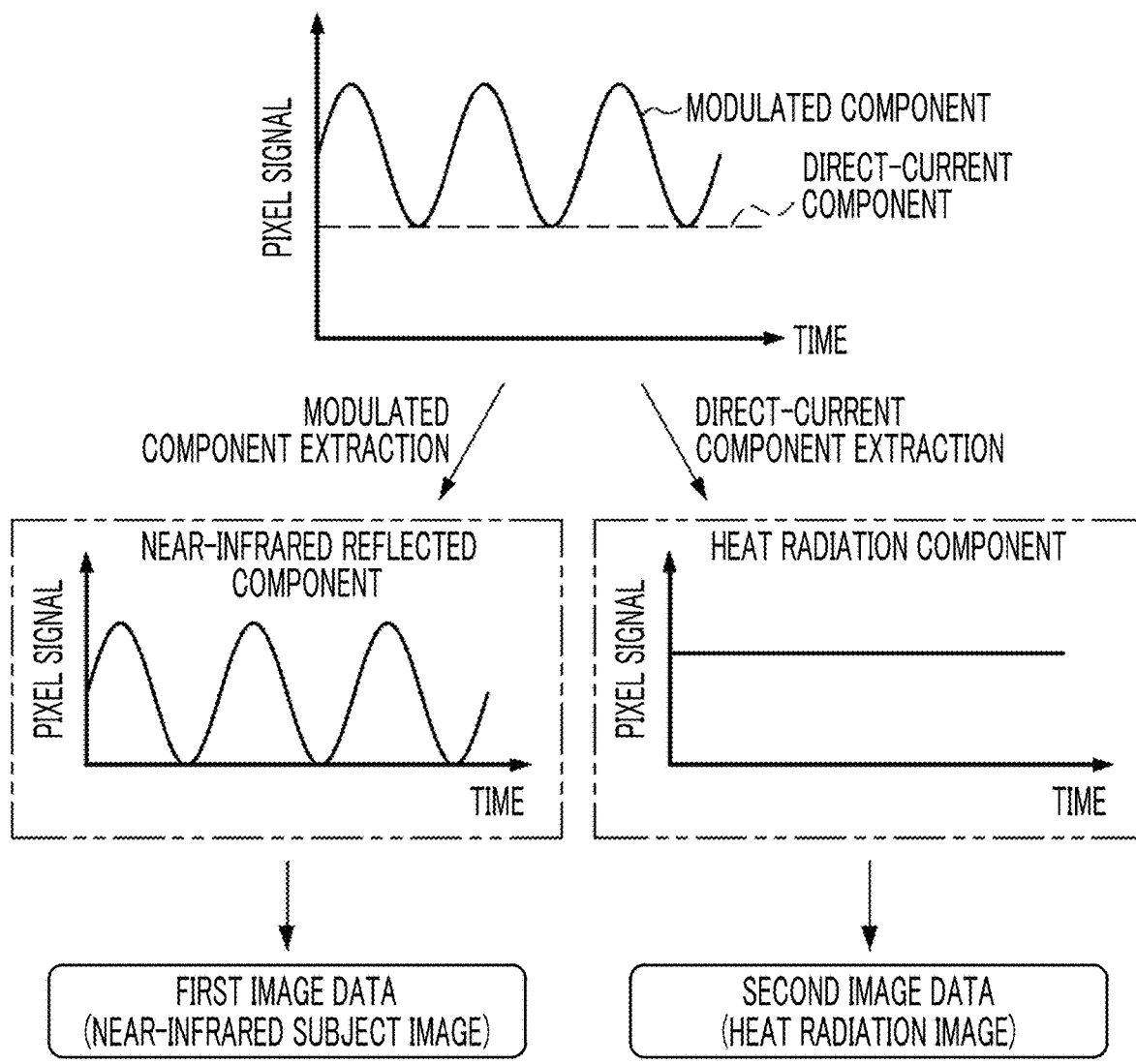
FIG. 8 is a diagram illustrating image processing of separately acquiring a near-infrared subject image and a heat radiation image.

FIG. 8 illustrates the image processing that is executed by the image processing unit 78. The image processing unit 78 generates first image data representing a near-infrared subject image based on a modulated component of the imaging signal output from the imaging sensor 14, and generates second image data representing a heat radiation image based on a direct-current component of the imaging signal.

The imaging signal is a set of pixel signals acquired by respective pixels of the imaging sensor 14 in a case of the near-infrared imaging. As shown in FIG. 8, a signal value of each pixel signal changes with time. In the pixel signal, the modulated component the signal value of which changes with time corresponds to the reflected light RL. On the other hand, in the pixel signal, the direct-current component the signal value of which does not change with time corresponds to the heat radiation.

The image processing unit 78 executes processing of the modulated component from each pixel signal and generates the first image data representing the near-infrared subject image (that is, the optical image of the subject by the near-infrared light) based on the extracted modulated component of each pixel. The image processing unit 78 defines, for example, a time average value of the modulated component of each pixel as each pixel value of the first image data.

The image processing unit 78 executes processing of extracting the direct-current component from each pixel signal and generates the second image data representing the heat radiation image (that is, a temperature image of the subject) based on the extracted direct-current component of each pixel. The image processing unit 78 defines, for example, a time average value of the direct-current component of each pixel as each pixel value of the second image data.

The first image data and the second image data generated by the image processing unit 78 are displayed as the near-infrared subject image and the heat radiation image of the subject on the image display unit 52.

In a case of the visible imaging, the light source 15 is not operated and the illumination light IL is not used. In this case, reflected light from the subject by visible light included in sunlight or the like is incident on the lens unit 20. A visible light component of the reflected light is transmitted through the first optical filter 41 and is incident on the imaging surface 14A of the imaging sensor 14.

The heat radiation from the subject has small intensity in the visible light wavelength range, and the imaging sensor 14 has low sensitivity in the visible light wavelength range. For this reason, in a case of the visible imaging, a heat radiation component is not obtained in the imaging sensor 14. Accordingly, in a case of the visible imaging, the image processing unit 78 does not execute the processing of the modulated component and the direct-current component described above, and generates image data based on the imaging signal.

Figure 9:
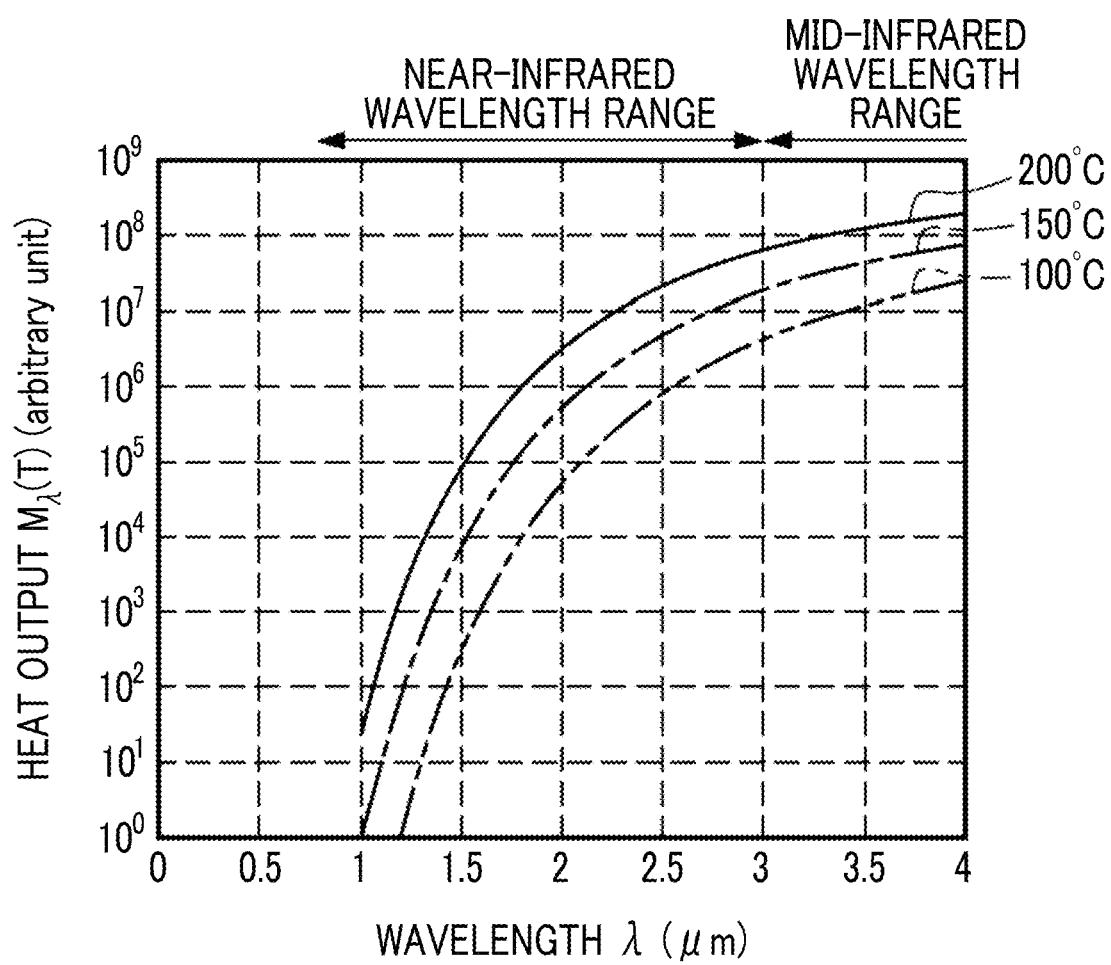
FIG. 9 is a graph showing wavelength dependence of a heat output.

FIG. 9 shows wavelength dependence of an output (hereinafter, referred to as "heat output") by the heat radiation in the near-infrared light wavelength range. The heat output shown in FIG. 9 is a value calculated based on a Planck distribution function represented by Expression (1) described below.

$$M_\lambda(T)d\lambda = \frac{2\pi hc^2}{\lambda^5} \frac{1}{\exp\left(\frac{hc}{\lambda kT}\right) - 1} d\lambda \quad (1)$$

Here, T represents an absolute temperature of the subject. λ represents a wavelength of the heat radiation. h represents a Planck constant. k represents a Boltzmann constant. c represents a velocity of light. $M_\lambda(T)$ represents a heat output in a case where the absolute temperature of the subject is T.

In FIG. 9, a solid line indicates the wavelength dependence of the heat output in a case where the temperature of the subject is 200° C. An one-dot chain line indicates the wavelength dependence of the heat output in a case where the temperature of the subject is 150° C. A two-dot chain line indicates the wavelength dependence of the heat output in a case where the temperature of the subject is 100° C.

Focusing on near a wavelength of 1550 nm, in a case where the temperature of the subject is 150° C., the heat output decreases to about 1/10 with a case where the temperature of the subject is 200° C., as a reference. In a case where the temperature of the subject is 100° C., the heat output decreases to about 1/100 or less with a case where the temperature of the subject is 200° C., as a reference. In a case where an InGaAs imaging element is used as the imaging sensor 14, a case where the temperature of the subject is 150° C. is a limit in terms of sensitivity, and in a case where the temperature of the subject is 100° C., the heat radiation is hardly detected. That is, in a case where the InGaAs imaging element is used as the imaging sensor 14, the heat radiation from the subject can be satisfactorily detected in a case where the temperature of the subject is equal to or higher than 200° C.

Figure 10:
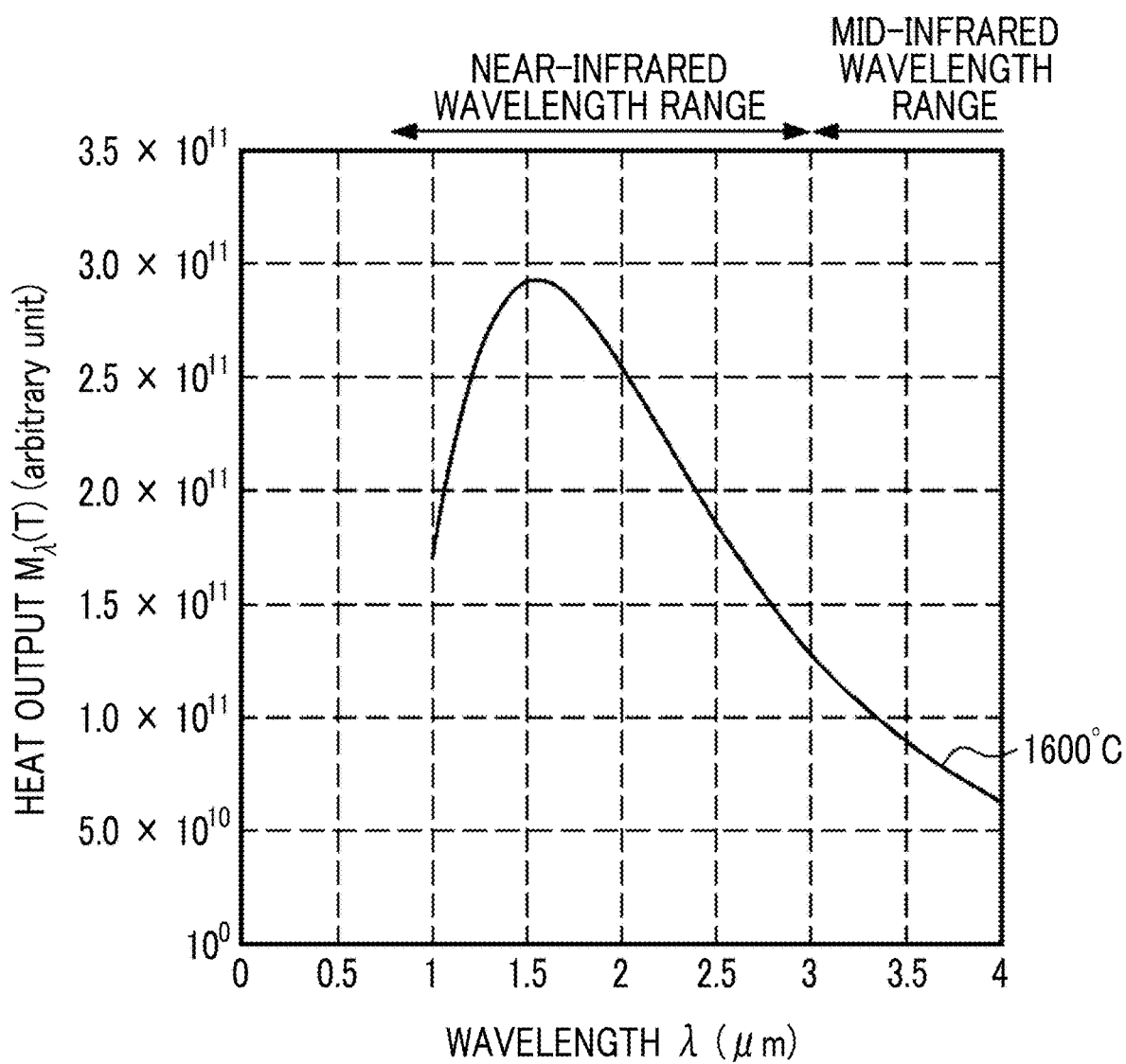
FIG. 10 is a graph showing a theoretical value of a heat output in a case where a temperature of a subject is 1600° C.

FIG. 10 shows a theoretical value of the heat output in a case where the temperature of the subject is 1600° C. As shown in FIG. 10, the heat output near a wavelength of 1550 nm is the highest in a case where the temperature of the subject is 1600° C. This indicates that, in a case where the temperature of the subject is equal to or higher than 1600° C., a heat output in a near-infrared wavelength range (0.8 µm to 3 µm) is higher than a heat output in a mid-infrared wavelength range (3 µm to 6 µm) and a far-infrared range (6 µm to 15 µm).

Accordingly, the camera 2 of the present embodiment can capture a heat radiation image in a near-infrared wavelength range with high sensitivity compared to a thermo-camera of the related art that images a mid-infrared wavelength range or a far-infrared range.

Figure 11:
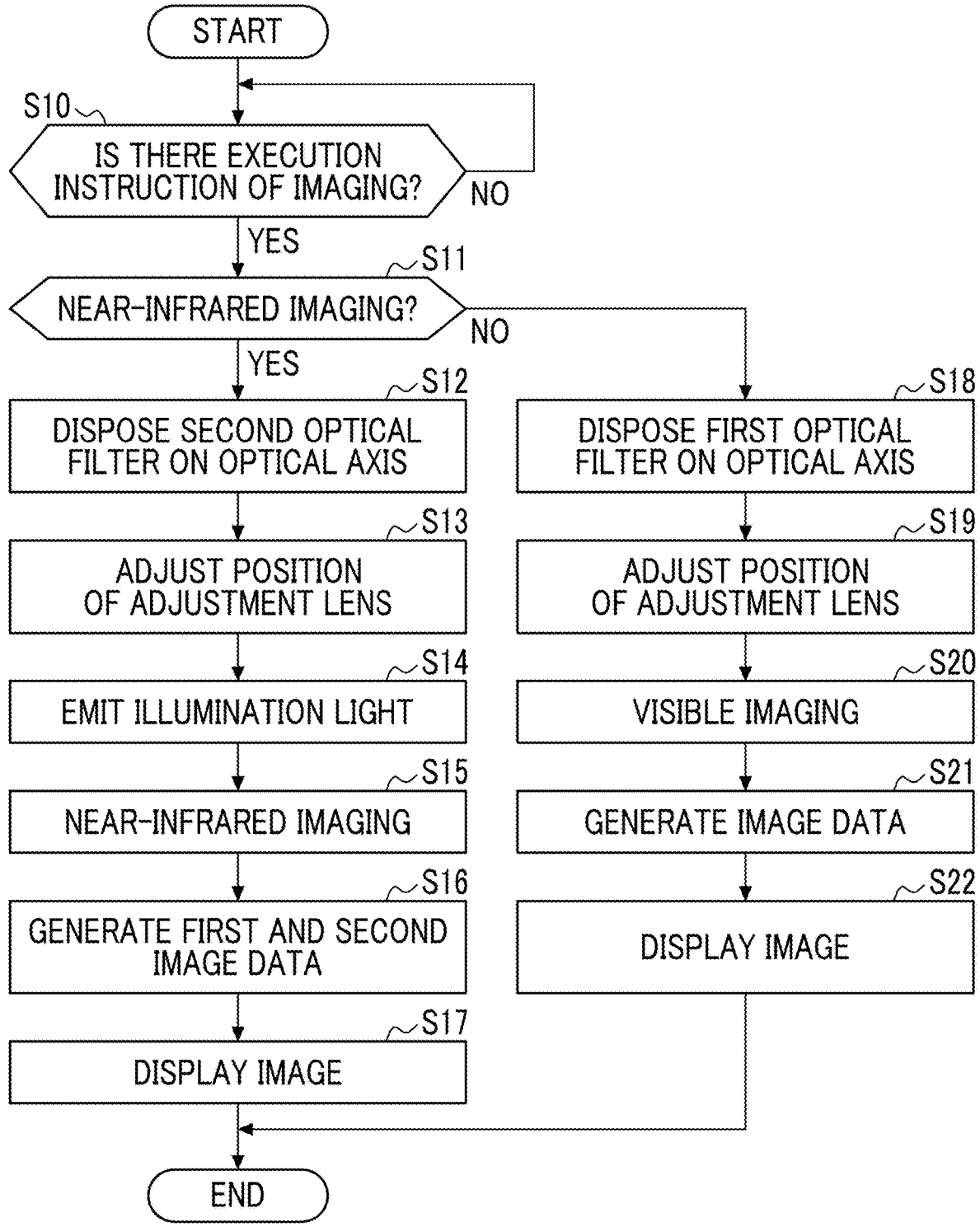
FIG. 11 is a flowchart illustrating an example of a flow of imaging processing.

Next, the operation of the camera 2 configured as above will be described. FIG. 11 is a flowchart illustrating an example of a flow of imaging processing that is executed by the CPU 80 following the imaging apparatus control program 83.

First, in Step S10, the CPU 80 determines whether or not the execution of the imaging is instructed by the user through the input unit 51. In Step S10, in a case where the execution of the imaging is instructed by the user, determination is affirmative, and the imaging processing progresses to Step S11.

In Step S11, the CPU 80 determines whether or not the type of the imaging the execution of which is instructed in Step S10 is near-infrared imaging. In Step S11, in a case where the type of the imaging is the near-infrared imaging, determination is affirmative, and the imaging processing progresses to Step S12. In Step S11, in a case where the type of the imaging is not the near-infrared imaging, that is, is visible imaging, determination is negative, and the imaging processing progresses to Step S18.

In Step S12, the CPU 80 performs control such that the turret drive unit 72 disposes the second optical filter 42 on the optical axis OP. In next Step S13, the CPU 80 performs control such that the adjustment lens drive unit 73 performs the position adjustment of the adjustment lens 34 to adjust the focusing position for the near-infrared light to match the imaging surface 14A of the imaging sensor 14.

In next Step S14, the CPU 80 performs control such that the light source drive controller 74 makes the illumination light IL having modulated luminescence intensity be emitted (see FIG. 7). In next Step S15, the CPU 80 makes the imaging sensor 14 perform the near-infrared imaging and acquires the imaging signal output from the imaging sensor 14.

In next Step S16, the CPU 80 makes the image processing unit 78 generate the first image data representing the near-infrared subject image and the second image data representing the heat radiation image based on the imaging signal (see FIG. 8). In next Step S17, the CPU 80 makes the image display unit 52 display the first image data and the second image data as the near-infrared subject image and the heat radiation image of the subject. With the above, the CPU 80 ends the imaging processing in a case where the execution of the near-infrared imaging is instructed.

Next, in Step S18 to which the image processing progresses in a case where the execution of the visible imaging is instructed, the CPU 80 performs control such that the turret drive unit 72 disposes the first optical filter 41 on the optical axis OP. In next Step S19, the CPU 80 performs control such that the adjustment lens drive unit 73 performs the position adjustment of the adjustment lens 34 to adjust the focusing position for the visible light to match the imaging surface 14A of the imaging sensor 14.

In next Step S20, the CPU 80 makes the imaging sensor 14 perform the visible imaging and acquires the imaging signal output from the imaging sensor 14. In next Step S21, the CPU 80 makes the image processing unit 78 generate image data representing a visible light image based on the imaging signal. In next Step S22, the CPU 80 makes the image display unit 52 display the image data generated in Step S21 as a subject image (hereinafter, referred to as a "visible subject image") by reflection of the visible light from the subject. With the above, the CPU 80 ends the imaging processing in a case where the execution of the visible imaging is instructed.

The above-described imaging processing is merely an example. Accordingly, it is needless to say that unnecessary steps may be deleted, new steps may be added, or a processing order may be changed without departing from the gist.

In the present embodiment, although an example where the imaging apparatus control program 83 and the focusing position data 84 are stored in the ROM 82 of the controller 50 has been described, the technique of the present disclosure is not limited thereto. For example, at least one of the imaging apparatus control program 83 or the focusing position data 84 may be stored in an HDD, an EEPROM, a flash memory, or the like connected to the bus line 79.

Figure 12:
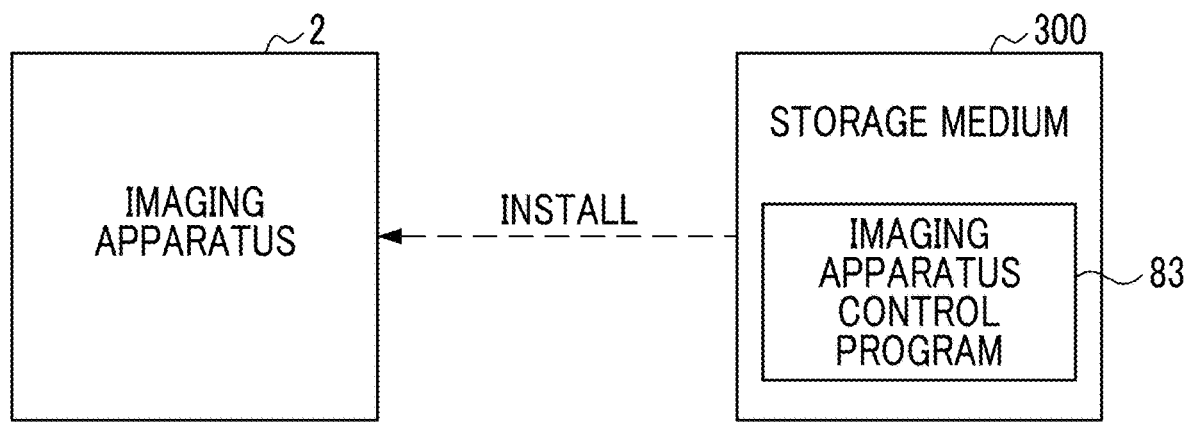
FIG. 12 is a conceptual diagram showing an aspect where a program is installed on the imaging apparatus from a storage medium.

As shown in FIG. 12, the imaging apparatus control program 83 may be stored in any portable storage medium 300, such as an SSD, a USB memory, or a DVD-ROM. The storage medium 300 is a storage medium that stores the program in a non-transitory manner and is readable by the computer 70. The imaging apparatus control program 83 stored in the storage medium 300 is installed on the computer 70 of the controller 50, and the installed imaging apparatus control program 83 is executed by the CPU 80 of the controller 50.

The imaging apparatus control program 83 may be stored in a storage unit of another computer, a server apparatus, or the like that is connected to the controller 50 of the camera 2 through a communication network (not shown), and the imaging apparatus control program 83 may be downloaded in response to a request of the camera 2. In this case, the downloaded imaging apparatus control program 83 is executed by the CPU 80 of the controller 50.

The controller 50 may be disposed in the lens unit 20. In a case where there are a plurality of types of the lens units 20, the controller 50 that stores all control programs of the respective lens units may be provided in the camera body 10. With this, a plurality of types of the lens units 20 that are connected to the camera body 10 can be controlled by the controller 50.

As the above, in the present embodiment, it is possible to acquire the heat radiation image in addition to the near-infrared subject image. In the present embodiment, the near-infrared subject image and the heat radiation image of the subject are generated by extracting the modulated component and the direct-current component from the imaging signal obtained by performing the near-infrared imaging using the illumination light IL subjected to intensity modulation. In this way, in the present embodiment, it is possible to separately acquire the near-infrared subject image and the heat radiation image of the subject.

In the above-described embodiment, although the near-infrared imaging is performed using the illumination light IL subjected to the intensity modulation, the technique of the present disclosure is not limited to intensity modulation, and the near-infrared imaging may be performed using illumination light IL subjected to frequency modulation. Even in this case, as in the above-described embodiment, it is possible to extract the modulated component and the direct-current component from the imaging signal.

Second Embodiment

Next, a second embodiment of the present disclosure will be described. In the first embodiment, the heat radiation image of the subject is generated by extracting the modulated component from the imaging signal obtained by performing the near-infrared imaging using the illumination light IL subjected to the intensity modulation. In the second embodiment, a heat radiation image of the subject is generated from an imaging signal obtained by performing the near-infrared imaging without using the illumination light IL and an imaging signal obtained by performing the visible imaging.

The present embodiment is useful in a case where there is little influence of scattering or the like described above or between the near-infrared light and the visible light, and a difference between the near-infrared subject image and the visible subject image is small. In the present embodiment, for example, the imaging of the subject is performed under sunlight or the like including the visible light and the near-infrared light.

Figure 13:
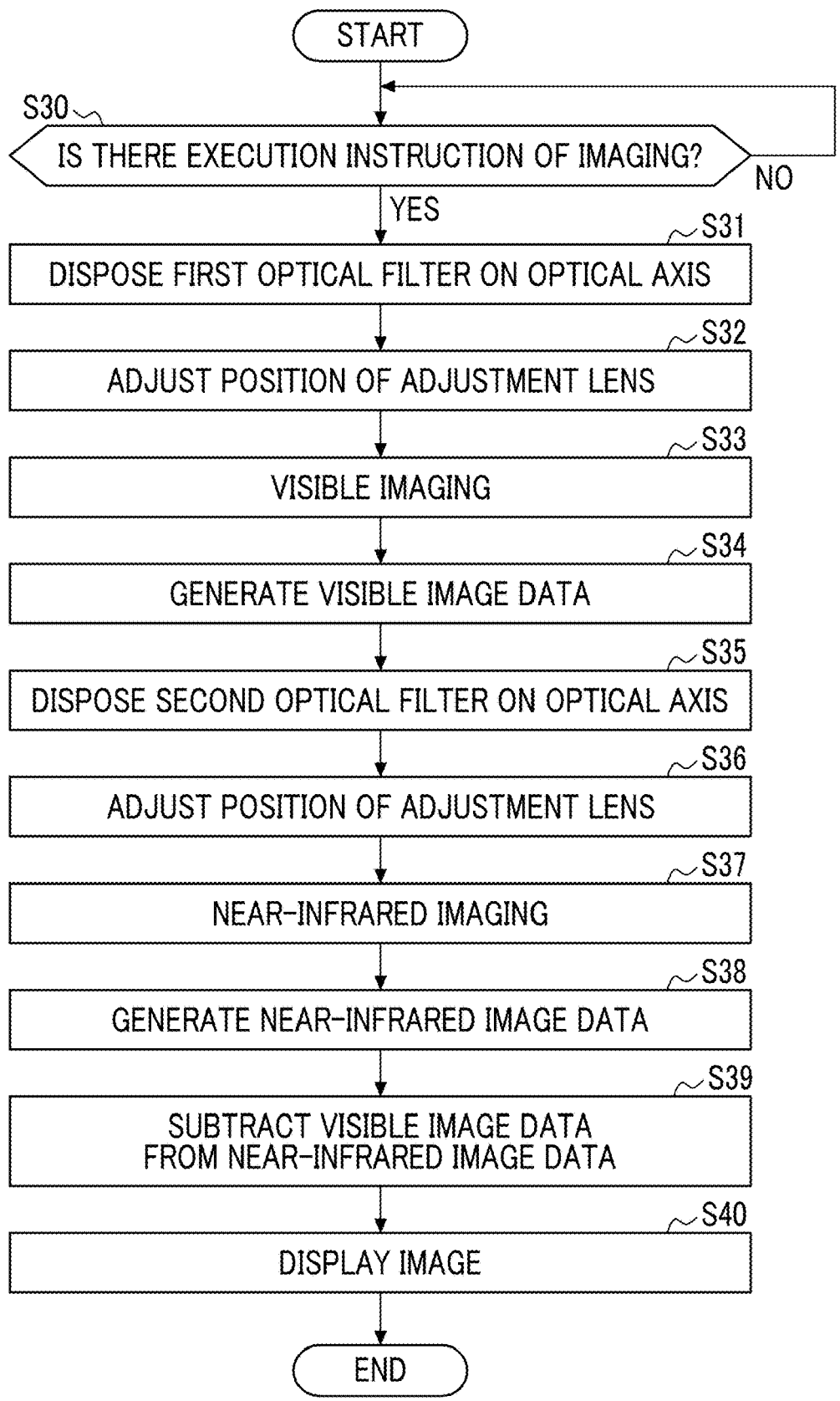
FIG. 13 is a flowchart illustrating an example of a flow of imaging processing by a camera according to a second embodiment.

FIG. 13 is a flowchart illustrating an example of a flow of imaging processing that is executed by the CPU 80 following the imaging apparatus control program 83 in the second embodiment. In near-infrared imaging processing of the present embodiment, since the illumination light IL is not used in the near-infrared imaging, for the configuration of the camera 2, the light source 15 and the light source drive controller 74 are not essential.

Hereinafter, a processing procedure of the imaging processing in the present embodiment will be described. First, in Step S30, the CPU 80 determines whether or not the execution of the imaging is instructed by the user through the input unit 51. In Step S30, in a case where the execution of the imaging is instructed by the user, determination is affirmative, and the imaging processing progresses to Step S31.

In Step S31, the CPU 80 performs control such that the turret drive unit 72 disposes the first optical filter 41 on the optical axis OP. In next Step S32, the CPU 80 performs control such that the adjustment lens drive unit 73 performs the position adjustment of the adjustment lens 34 to adjust the focusing position for the visible light to match the imaging surface 14A of the imaging sensor 14.

In next Step S33, the CPU 80 makes the imaging sensor 14 perform the visible imaging and acquires the imaging signal output from the imaging sensor 14. In next Step S34, the CPU 80 makes the image processing unit 78 generate image data (hereinafter, referred to as "visible image data") representing a visible light image based on the imaging signal.

In Step S35, the CPU 80 performs control such that the turret drive unit 72 disposes the second optical filter 42 on the optical axis OP. In next Step S36, the CPU 80 performs control such that the adjustment lens drive unit 73 performs the position adjustment of the adjustment lens 34 to adjust the focusing position for the near-infrared light to match the imaging surface 14A of the imaging sensor 14.

In next Step S37, the CPU 80 makes the imaging sensor 14 perform the near-infrared imaging and acquires the imaging signal output from the imaging sensor 14. In next Step S38, the CPU 80 makes the image processing unit 78 generate image data (hereinafter, referred to as "near-infrared image data") representing a near-infrared light image based on the imaging signal.

In next Step S39, the CPU 80 makes the image processing unit 78 execute subtraction processing of subtracting the visible image data obtained in Step S34 from the near-infrared image data obtained in Step S38. In the near-infrared image data, information regarding both the near-infrared subject image and the heat radiation image of the subject is included. In the visible image data, the visible subject image of the subject is included. As described above, in the present embodiment, the imaging of the subject is performed under a situation that the near-infrared subject image and the visible subject image are substantially equal. Accordingly, image data that is generated as a result of the subtraction processing of the image processing unit 78 represents the heat radiation image by the heat radiation.

In next Step S40, the CPU 80 makes the image display unit 52 display the image data generated in Step S39 as the heat radiation image of the subject. In Step S40, the image display unit 52 may display the visible light image based on the visible image data, in addition to the heat radiation image. With the above, the CPU 80 ends the imaging processing.

The above-described imaging processing is merely an example. Accordingly, it is needless to say that unnecessary steps may be deleted, new steps may be added, or a processing order may be changed without departing from the gist.

As the above, in the present embodiment, the near-infrared light and the visible light are selectively imaged by the imaging sensor 14 under sunlight or the like including the visible light and the near-infrared light without using the illumination light IL, and the heat radiation image is obtained by subtracting the visible subject image from the near-infrared subject image obtained through the imaging. In this way, in the present embodiment, the subject is imaged under sunlight or the like without using a light source for near-infrared light, whereby it is possible to acquire the heat radiation image of the subject.

In the above-described first and second embodiments, although the near-infrared subject image of the subject by the near-infrared light and the heat radiation image are separately displayed, one near-infrared image including information regarding both a near-infrared subject image and a heat radiation image may be displayed. The near-infrared image is an image in which a heat radiation image is superimposed on a clear near-infrared subject image.

In the above-described first and second embodiments, the amount of incident light on the imaging sensor 14 is adjusted by the stop 33, whereby it is possible to suppress the saturation of the imaging signal and to obtain a clear image. The saturation of the imaging signal may be suppressed by providing a mechanical shutter instead of the stop 33 and adjusting a shutter speed of the mechanical shutter. The saturation of the imaging signal may be suppressed by adjusting an electric charge accumulation period of the imaging sensor 14 (that is, adjusting a shutter speed of an electronic shutter).

In the above-described first and second embodiments, although the turret filter 40 that is a rotary filter device is provided, the technique of the present disclosure is not limited to the rotary filter device, and a translatable filter device may be used.

Optical Characteristic of Imaging Optical System

Next, an optical characteristic of an imaging optical system included in the lens unit 20 will be described in detail. In each lens, the above-described coating layer 60 is formed by coating. The coating layer 60 is formed by laminating a light transmitting material, such as $TiO_2$, $Ta_2O_5$, $Al_2O_3$, $SiO_2$, or $MgF_2$, on a lens surface in a thin film shape. It is preferable that the coating layer 60 is configured with a plurality of layers. A refractive index, a thickness, and the number of layers of a material for forming a thin film are adjusted, whereby it is possible to increase light transmittance in a specific wavelength range and to decrease light transmittance in a specific wavelength range. A coating material, a coating thickness, and the number of coating layers for increasing or decreasing light transmittance in a specific wavelength range can be decided by a computer simulation or the like.

Light transmittance means a ratio of, in a case where light having a certain wavelength is incident on, for example, a lens, the intensity of light emitted from the lens to the intensity of light incident on the lens, and is represented by the following expression.

light transmittance(%)=100×(emitted light intensity)/(incident light intensity)

Though shown in FIG. 2 in a simplified manner, each of the objective lens 30, the focus lens 31, the zoom lens 32, and the adjustment lens 34 is configured with a group of one or more lenses. The imaging optical system included in the lens unit 20 is configured with several to several tens of lenses as the whole. In each lens, the coating layer 60 is formed. The coating layer 60 may be formed on a part of lenses of the imaging optical system, but is preferably formed on all lenses.

To enable the near-infrared imaging, it is preferable that the imaging optical system has high light transmittance at a wavelength near 1550 nm. To enable the visible imaging, it is preferable that the imaging optical system has high light transmittance in as wide a range of the visible light as possible.

To satisfy the above-described two conditions, it is preferable that, in the near-infrared light wavelength range, the near-infrared light peak wavelength range NIR including 1550 nm has a peak of light transmittance in the near-infrared light wavelength range. That is, it is preferable that light transmittance on a short wavelength side with respect to the near-infrared light peak wavelength range NIR including 1550 nm decreases from light transmittance at a short wavelength end of the near-infrared light peak wavelength range NIR as the wavelength decreases. It is preferable that light transmittance on a long wavelength with respect to the near-infrared light peak wavelength range NIR decreases from light transmittance at a long wavelength end of the near-infrared light peak wavelength range NIR as the wavelength increases.

It is preferable that the visible light wavelength range has the visible light peak wavelength range VIS including a range of 500 nm to 650 nm. That is, it is preferable that light transmittance on a short wavelength side with respect to the visible light peak wavelength range VIS including the range of 500 nm to 650 nm decreases from light transmittance at a short wavelength of the visible light peak wavelength range VIS as the wavelength decreases. It is preferable that light transmittance on a long wavelength side with respect to the visible light peak wavelength range VIS decreases from light transmittance at a long wavelength end of the visible light peak wavelength range VIS as the wavelength increases.

The inventors and the like have found that an imaging optical system that has high resolution in both the near-infrared light and the visible light and particularly has very high resolution in the near-infrared light can be manufactured by forming the coating layer 60 that has the light transmittance peak having the above-described features.

Since the near-infrared light has a small amount of scattering due to fine particles in the atmosphere, in the near-infrared imaging, an image with high sharpness is obtained in distant imaging compared to the visible imaging. Considering a case where the near-infrared imaging is executed using the zoom function with a distant subject as an imaging target, scattering and absorption of the near-infrared light by the atmosphere and the lens are the smallest near 1550 nm. Thus, it is preferable that the imaging optical system has high light transmittance near 1550 nm.

The "near-infrared light peak wavelength range" indicates a wavelength range where the presence of the light transmittance peak of the near-infrared light wavelength range is permitted for design to increase light transmittance near 1550 nm as high as possible. As described below, a plurality of peaks having the same height or different heights may be present in the near-infrared light peak wavelength range NIR. The near-infrared light peak wavelength range NIR is, for example, a wavelength range of 1450 nm to 1650 nm. Preferably, the near-infrared light peak wavelength range NIR is a wavelength range of 1480 nm to 1620 nm. More preferably, the near-infrared light peak wavelength range NIR is a wavelength range of 1500 nm to 1580 nm. In particular, in a case where the imaging optical system is a long-focus zoom imaging optical system that can observe a long distance, an observation distance decreases as light transmittance in the near-infrared light peak wavelength range NIR decreases. Thus, light transmittance in the near-infrared light peak wavelength range NIR becomes important.

Light transmittance in the near-infrared light peak wavelength range NIR is preferably equal to or greater than 60%, more preferably equal to or greater than 70%, and still more preferably equal to or greater than 80%. A peak value of light transmittance in the near-infrared light peak wavelength range NIR is preferably equal to or greater than 80%, more preferably equal to or greater than 85%, and still more preferably equal to or greater than 90%. In particular, light transmittance at a wavelength of 1550 nm is preferably equal to or greater than 80%, more preferably equal to or greater than 85%, more preferably equal to or greater than 88%, and still more preferably equal to or greater than 90%.

The "visible light peak wavelength range" indicates a wavelength range where light transmittance near 1550 nm is as high as possible, and to secure a range where high light transmittance is high, in the visible light wavelength range, the presence of the peak of the peak of light transmittance in the visible light wavelength range is permitted. As described below, a plurality of peaks having the same height or different heights may be present in the visible light peak wavelength range VIS. The visible light peak wavelength range VIS is, for example, a wavelength range of 450 nm to 700 nm. Preferably, the visible light peak wavelength range VIS is a wavelength range of 480 nm to 680 nm. More preferably, the visible light peak wavelength range VIS is a wavelength range of 500 nm to 650 nm.

Light transmittance in the visible light peak wavelength range VIS is preferably equal to or greater than 50%, more preferably equal to or greater than 60%, and still more preferably equal to or greater than 70%. A peak value of light transmittance in the visible light peak wavelength range VIS is preferably equal to or greater than 85%, more preferably equal to or greater than 90%, and still more preferably equal to or greater than 93%.

Light transmittance described above is light transmittance of the entire imaging optical system included in the lens unit 20. Light transmittance is an integrated value of light transmittance of each lens. For example, in a case where light transmittance x of the individual lens is the same, and the number of lenses is n, light transmittance X of the entire imaging optical system is given by $X=x^n$. Though depending on the number of lenses, light transmittance per lens is preferably equal to or greater than 95%, more preferably equal to or greater than 98%, and still more preferably equal to or greater than 99%.

Figure 14:
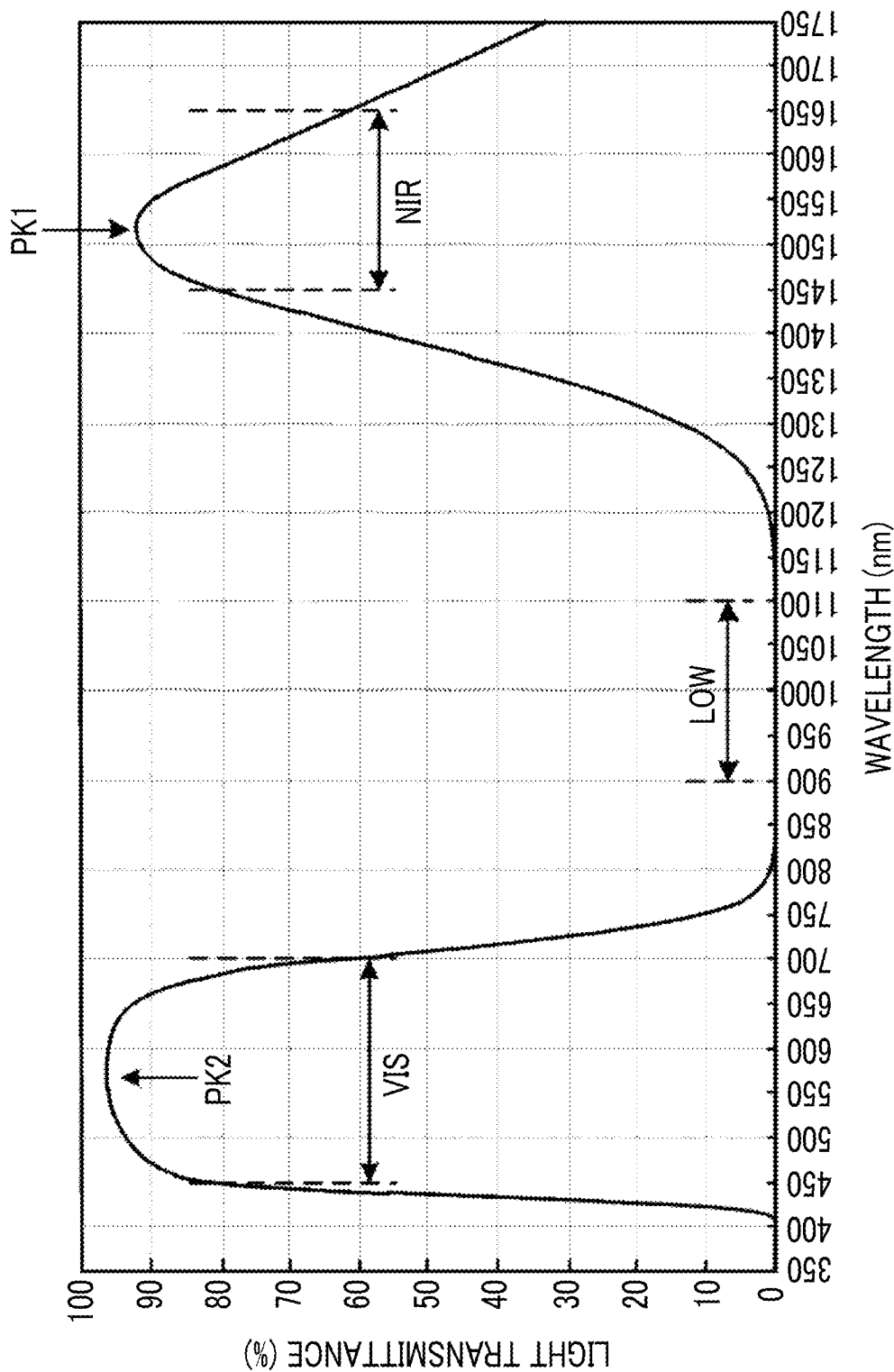
FIG. 14 is a diagram showing an example of a profile of light transmittance of an imaging optical system.

FIG. 14 shows an example of a profile of light transmittance of the imaging optical system. As shown in FIG. 14, the profile of light transmittance of the imaging optical system has a first transmittance peak PK1 in the near-infrared light peak wavelength range NIR of 1450 nm to 1650 nm. In the present example, light transmittance at the first transmittance peak PK1 is about 92% at a wavelength of 1520 nm. Light transmittance in a wavelength of 1490 nm to 1560 nm is equal to or greater than 90%.

The profile of light transmittance of the imaging optical system has a second transmittance peak PK2 in the visible light peak wavelength range VIS of 450 nm to 700 nm. In the present example, light transmittance at the second transmittance peak PK2 is about 96% at a wavelength of 570 nm to 580 nm. Light transmittance in a wavelength range of 480 nm to 660 nm is equal to or greater than 90%.

Light transmittance in a wavelength range on a short wavelength side in a blue wavelength range included in the visible light wavelength range is lower than light transmittance in a wavelength range on a long wavelength in the blue wavelength range. Specifically, light transmittance in a wavelength range equal to or less than 450 nm in the blue wavelength range is lower than light transmittance in a wavelength range longer than 450 nm. Light transmittance at a wavelength of 400 nm to 430 nm is equal to or less than 50%. In a case where light transmittance at a wavelength of 400 nm to 430 nm is greater than 50%, light transmittance of 1200 nm to 1290 nm that is a third harmonic and is a peak of a near-infrared wavelength range also increases. This means that the peak of the near-infrared wavelength range is widened, and there is a possibility that light transmittance near a wavelength of 1550 nm decreases or characteristic degradation, such as remaining of ripples, occurs.

The imaging optical system has a low light transmittance range LOW where light transmittance is lower than light transmittance in the near-infrared light peak wavelength range NIR and the visible light peak wavelength range VIS, over a wavelength of 900 nm to 1100 nm between the near-infrared light peak wavelength range NIR and the visible light peak wavelength range VIS. It is preferable that light transmittance in the low light transmittance range LOW is equal to or less than 5%. The low light transmittance range LOW is a range that occurs along with formation of a light transmittance peak for a near-infrared light range in the near-infrared light peak wavelength range NIR and formation of a light transmittance peak for a visible light range in the visible light peak wavelength range VIS. A wavelength of the low light transmittance range LOW is a wavelength range that does not contribute to any of the visible imaging and the near-infrared imaging. Thus, low light transmittance in the low light transmittance range LOW does not cause a problem in the visible imaging and the near-infrared imaging.

In this way, the low light transmittance range LOW is provided in the light transmission characteristic of the imaging optical system, whereby it is possible to increase light transmittance in the near-infrared light peak wavelength range NIR and the visible light peak wavelength range VIS compared to an imaging optical system having a wide light transmission range.

The profile of light transmittance shown in FIG. 14 has one first transmittance peak PK1 in the near-infrared light peak wavelength range NIR and has one second transmittance peak PK2 in the visible light peak wavelength range VIS. Note that the profile of light transmittance of the present disclosure is not limited thereto. A shape (ripples) of a waveform formed by a plurality of light transmittance peaks may occur in the near-infrared light peak wavelength range NIR. Ripples may occur in the visible light peak wavelength range VIS. The ripples are a shape that shows one characteristic of fluctuation of light transmittance. In this way, the profile may have a light transmittance peak in the near-infrared light peak wavelength range NIR and may have a light transmittance peak in the visible light peak wavelength range VIS, and the presence or absence of ripples, that is, the number of light transmittance peaks is not limited.

A half-width of the first transmittance peak PK1 that is formed in the near-infrared light peak wavelength range NIR may be as narrow as possible. The near-infrared light that has a longer wavelength than the visible light is likely to show chromatic aberration compared to the visible light in a case where a wavelength range is widened. Accordingly, it is preferable that a wavelength range to be images is as narrow as possible.

The profile of light transmittance shown in FIG. 14 is obtained by forming a coating layer such that a light transmittance peak corresponding to a ⅓ wavelength of a fundamental wave having a peak near 1550 nm is present in the visible light peak wavelength range VIS. A light transmittance profile that satisfies the above-described condition is obtained by forming a coating layer such that a light transmittance peak corresponding to a ½ wavelength of the fundamental wave is not present, and the light transmittance peak corresponding to the ⅓ wavelength increases.

Figure 15:
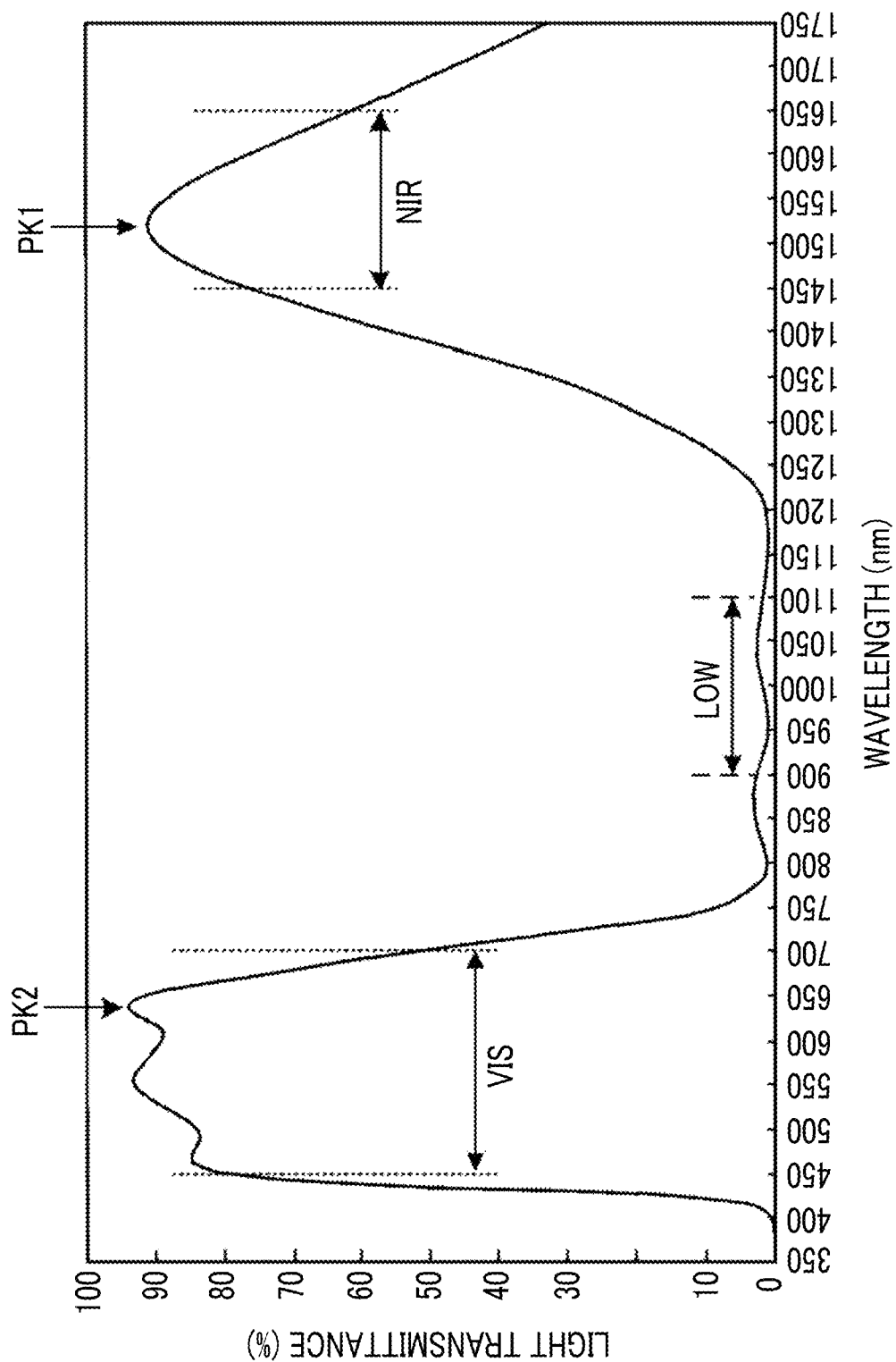
FIG. 15 is a diagram showing another example of a profile of light transmittance of the imaging optical system.

FIG. 15 shows another example of a profile light transmittance of the imaging optical system. In the light transmittance profile shown in FIG. 15, ripples appear in the visible light peak wavelength range VIS. On the other hand, ripples do not appear in the near-infrared light peak wavelength range NIR. Ripples are likely to be generated in a case where, for example, the number of coating layers is small. That is, the number of coating layers increases, whereby it is possible to reduce the number or the size of ripples. The number of ripples means the number of peaks. The size of ripples means the greatest height among heights from a lowest position between adjacent peaks.

Ripples may appear in the near-infrared light peak wavelength range NIR, In addition to the visible light peak wavelength range VIS. In this case, it is preferable that at least one of the size or the number of ripples in the near-infrared light peak wavelength range NIR is smaller than the size or the number of ripples in the visible light peak wavelength range VIS.

It is preferable that ripples do not occur in the near-infrared light peak wavelength range NIR. A single light transmittance peak with no ripples occurs in the near-infrared light peak wavelength range NIR, whereby it is possible to increase a light transmittance peak value in the near-infrared light peak wavelength range NIR. With this, it is possible to increase the resolution of an image that is obtained through near-infrared imaging.

Scattering Phenomenon

Next, a scattering phenomenon of visible light and near-infrared light due to the atmosphere will be described.

Figure 16:
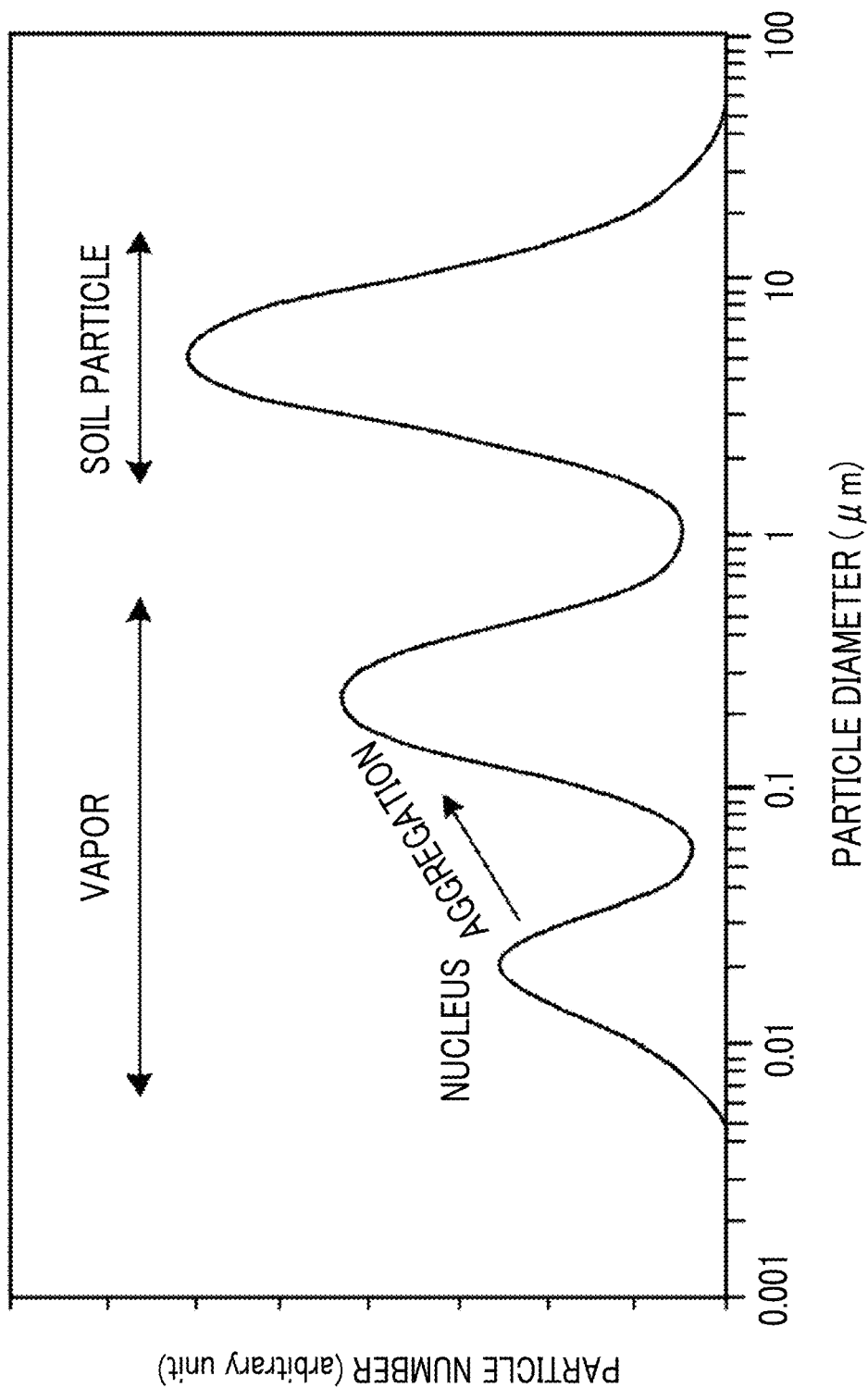
FIG. 16 is a diagram showing a particle number of fine particles in the atmosphere.

FIG. 16 shows particle numbers of fine water droplets and fine dust included in the atmosphere. As shown in FIG. 16, a peak of a fine particle of vapor is present between several nm to several tens of nm and a hundred nm to several hundreds of nm of a particle diameter. That is, it is known that an amount of presence of the fine vapor particle having a diameter in this range is large. Light that passes through the atmosphere is mainly scattered by the fine vapor particle having the former diameter and is scattered by fine vapor particle having the latter diameter. The former scattering is Rayleigh scattering, and the latter scattering is Mie scattering.

With such scattering, as an imaging distance of the camera 2 increases, an amount of light that reaches the camera 2 is reduced. A reduction rate is higher for the visible light than the near-infrared light. Accordingly, a captured image having higher resolution is obtained through the near-infrared imaging than through the visible imaging.

Figure 17:
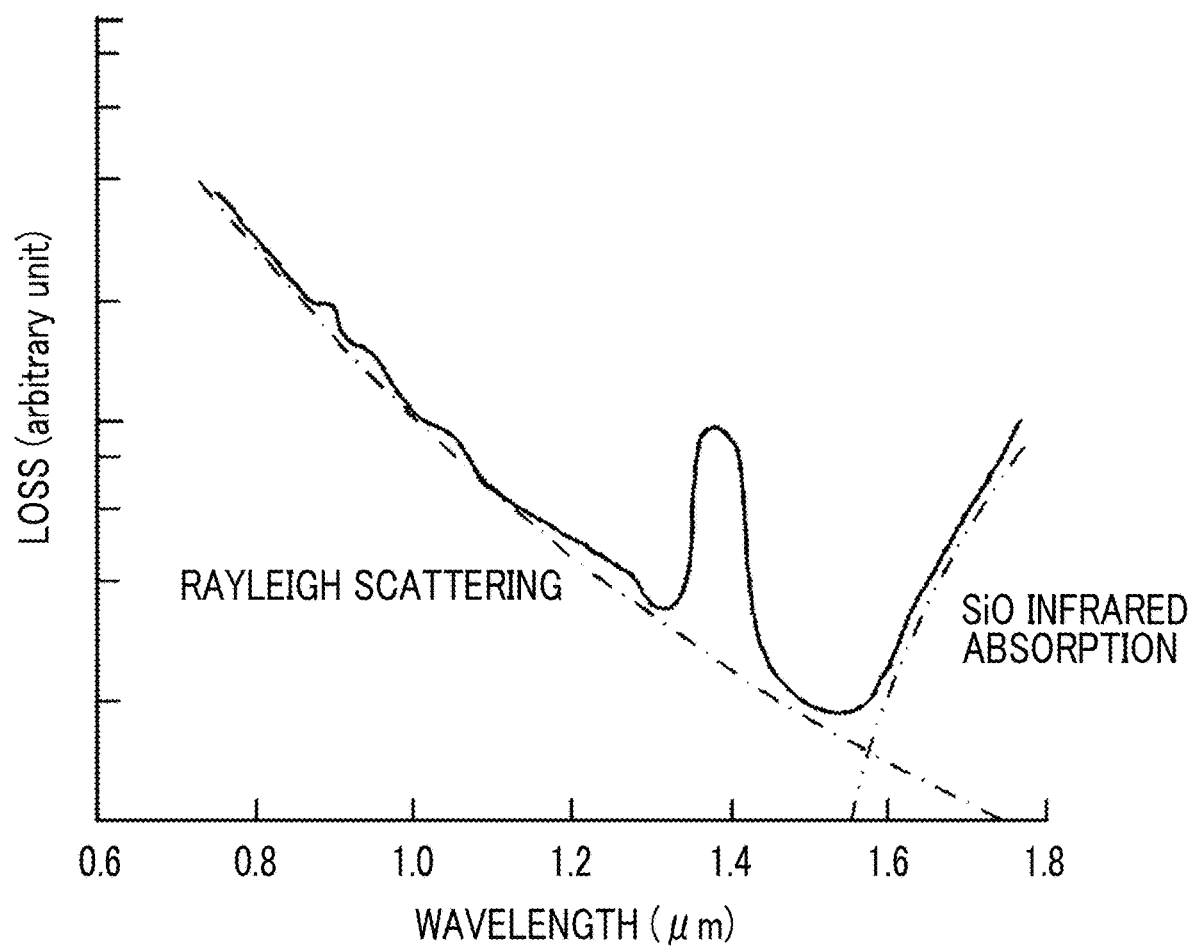
FIG. 17 is a diagram showing an amount of optical loss due to absorption and scattering in a lens.

On the other hand, light that passes through the imaging optical system is also subjected to scattering and absorption due to an ingredient of the lens included in the imaging optical system. As shown in FIG. 17, light that passes through the lens is subjected to Rayleigh scattering and infrared absorption due to silicon dioxide that is a main ingredient of the lens. As indicated by a one-dot chain line in the drawing, Rayleigh scattering decreases as the wavelength increases. As indicated by a two-dot chain line in the drawing, in regard to infrared absorption by Si—O bond, the absorption starts from around a wavelength of 1550 nm, and the absorption increases as the wavelength increases. Strong absorption that appears near a wavelength of 1400 nm is an absorption peak by OH⁻ of a lens ingredient.

A solid line in the drawing represents an amount of decrease (loss) in amount of light due to scattering and absorption in the lens. In this way, the loss of the amount of light is the greatest in a range near a wavelength of 1550±100 nm. That is, transmittance of light of lens optics is the highest in a wavelength range of 1550±100 nm.

In a case of the Rayleigh scattering, scattering intensity is inversely proportional to the fourth power of a wavelength of scattered light. Accordingly, in a case of the Rayleigh scattering, scattering intensity of the near-infrared light having a wavelength of 1550 nm is about 1/72 of scattering intensity of the visible light having a wavelength of 553 nm.

In a case of Mie scattering, it is known that a scattering amount (forward scattering amount) of the near-infrared light having a wavelength of 1550 nm is about 1/191 of a scattering amount of light having a wavelength of 770 nm.

As described above, it is perceived that, even in the near-infrared light, light near a wavelength of 1550 nm has a wavelength most appropriate for suppressing scattering and absorption in the atmosphere and the lens. Based on such a review, the present inventors and the like have found that, in an imaging apparatus capable of imaging using visible light and near-infrared light, setting a range including a wavelength of 1550 nm as an imaging wavelength range of the near-infrared light is most appropriate for improving the resolution of the captured image.

Accordingly, it is preferable that the transmittance profile of the imaging optical system has a peak of transmittance in a range including 1550 nm. It is preferable that the imaging optical system has a range in which light transmittance is high, even in the visible light wavelength range. As a result of keen examination of the present inventors and the like, it is apparent that the transmittance profile of the imaging optical system has a range where light transmittance is low, formed between the visible light wavelength range and the near-infrared light wavelength range including 1550 nm.

The present inventors and the like have found that light transmittance in a wavelength range including 1550 nm can be further improved by decreasing light transmittance at a specific wavelength in the visible light. This is useful in a case where the resolution of an image obtained through the near-infrared imaging increases with priority over the resolution of an image obtained through the visible imaging.

Example 1

Figure 18:
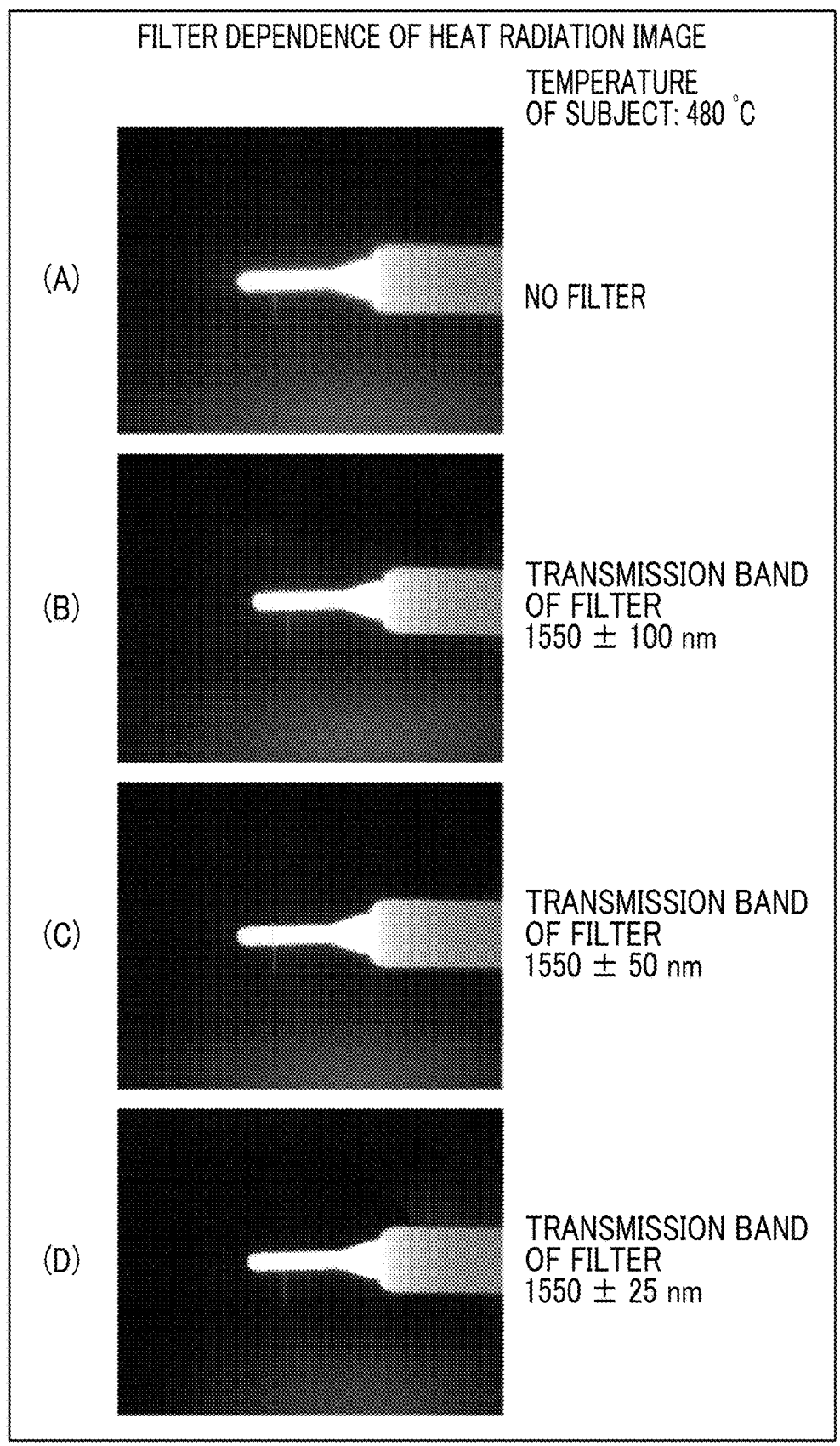
FIG. 18 is a diagram illustrating filter dependence of a heat radiation image.

Next, filter dependence of a heat radiation image obtained through near-infrared imaging will be described. FIG. 18 shows an image an image obtained by imaging a distal end portion of soldering iron at a temperature of 480° C. as a subject through near-infrared imaging in a darkroom where illumination is turned off. That is, the image shown in FIG. 18 corresponds to the heat radiation image of the above-described embodiment.

(A) is a heat radiation image obtained without disposing an optical filter on the optical axis. (B) is a heat radiation image in a case where an optical filter having transmittance in a wavelength range of 1550±100 nm is disposed on the optical axis. (C) is a heat radiation image in a case where an optical filter having transmittance in a wavelength range of 1550±50 nm is disposed on the optical axis. (D) is a heat radiation image in a case where an optical filter having transmittance in a wavelength range of 1550±25 nm is disposed on the optical axis. That is, (B) and (C) are different in light transmission bandwidth of the optical filter.

As shown in FIG. 18, it is understood that the heat radiation image of the subject is made clear by disposing the optical filter having a light transmission bandwidth centering on 1550 nm is disposed to perform the near-infrared imaging. It is understood that the resolution of the heat radiation image is improved as the light transmission bandwidth of the optical filter is narrowed. It is considered that this is because chromatic aberration is reduced as the light transmission bandwidth is narrowed.

In this way, in the near-infrared imaging, it is preferable that a band-pass filter having a light transmission bandwidth equal to or less than 200 nm centering on 1550 nm is used. With this, it is possible to acquire a clear heat radiation image.

Example 2

Figure 19:
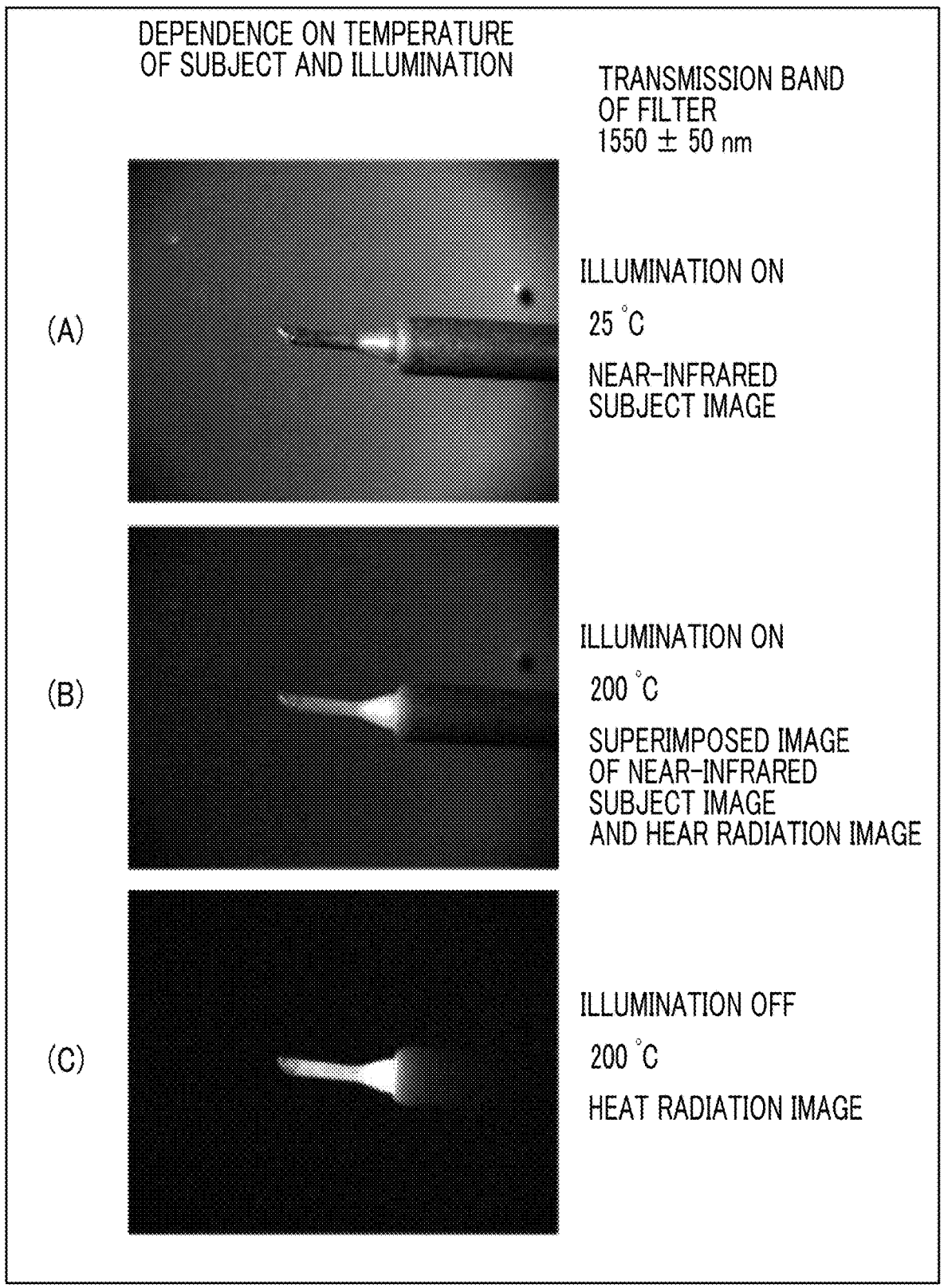
FIG. 19 is a diagram illustrating dependence of near-infrared imaging on a temperature of a subject and illumination.

Next, dependence of near-infrared imaging on a temperature of a subject and illumination will be described. FIG. 19 shows an image obtained by performing near-infrared imaging in a state in which illumination is on or off, using an optical filter having transmittance in a wavelength range of 1550±50 nm. Here, a subject is a distal end portion of soldering iron as in Example 1. As a light source, an LED that emits near-infrared light having a peak wavelength of 1550 nm is used. Illumination light is not modulated. Each image is an image obtained by turning on or off illumination and imaging the subject through near-infrared imaging in a darkroom.

(A) is an image obtained by turning on illumination and setting the subject at a room temperature (25° C.) to perform the near-infrared imaging. In a case where the subject is 25° C., the imaging sensor has low sensitivity to heat radiation, and a heat radiation image is hardly obtained. For this reason, the image shown in (A) corresponds to a near-infrared subject image of the subject.

(B) is an image obtained by turning on illumination in a state in which the subject is set at 200° C., to perform near-infrared imaging. In a case where the subject is at 200° C., the imaging sensor has sensitivity to heat radiation. Thus, an image including information both a near-infrared subject image and a heat radiation image is obtained. For this reason, the image shown in (B) corresponds to an image in which a heat radiation image is superimposed on a near-infrared subject image. While a high temperature portion of the subject is represented by a heat radiation image, a low temperature portion of the subject is represented by a near-infrared subject image. A white portion in the image shown in (B) corresponds to the high temperature portion of the subject. Accordingly, with the image shown in (B), it is possible to allow the user to visually recognize the high temperature portion of the subject.

(C) is an image obtained by turning off illumination in a state in which the subject is at 200° C., to perform near-infrared imaging. Since illumination is turned off, the image shown in (C) corresponds to a heat radiation image of the subject. In this image, only information regarding the temperature of the subject is obtained. With this image, it is understood that, in the near-infrared imaging, unevenness of the temperature of the subject that cannot be observed through imaging using mid-infrared light or far-infrared light can be clearly observed.

Comparative Example

Figure 20:
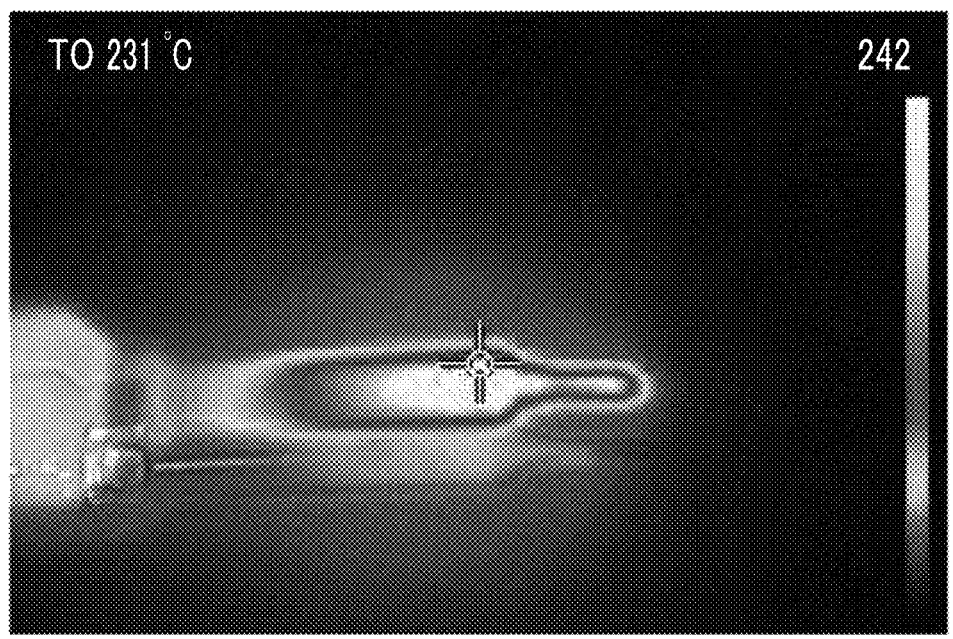
FIG. 20 is a diagram showing a temperature image obtained by a bolometer as a comparative example.

FIG. 20 illustrates, as a comparative example, a temperature image (heat radiation image) obtained by performing imaging with a bolometer as a temperature sensor of the related art with a distal end part of soldering iron at a temperature of about 200° C. as a subject.

In a temperature measurement of the related art, a temperature sensor that has sensitivity to mid-infrared light or far-infrared light is used to obtain sensitivity to a temperature equal to or less than 100° C. For example, since the bolometer performs the temperature measurement based on change in resistance due to heat absorption, the bolometer has a large pixel size. The pixel size is, for example, equal to or greater than 50 μm. For this reason, in the bolometer, as shown in FIG. 20, it is not possible to obtain a clear heat radiation image.

In the bolometer, an imaging optical system that has high light transmittance to mid-infrared light or far-infrared light is used. In such an imaging optical system, since a lens formed of a material, such as germanium, is used, visible light is not transmitted therethrough. For this reason, in the bolometer, visible imaging cannot be performed. The imaging optical system is hardly given a zoom function.

In contrast, in the technique of the present disclosure, an InGaAs imaging element that can detect light in the wavelength range of 500 nm to 1700 nm is used as the imaging sensor 14. The imaging sensor 14 has sensitivity to visible light in addition to near-infrared light and has a pixel size smaller than a bolometer. Thus, the imaging sensor 14 can acquire a clear visible subject image in addition to a clear near-infrared image (near-infrared subject image and heat radiation image). In this case, since a lens formed of a material, such as silicon, can be used in the imaging optical system, the imaging optical system can be given a zoom function. With this, it is possible to perform acquisition of a heat radiation image of a distant subject (that is, temperature measurement of the distant subject).

In each embodiment described above, for example, as the hardware structure of the controller 50, various processors described below can be used. Various processors described above include a PLD that is a processor capable of changing a circuit configuration after manufacture, such as an FPGA, a dedicated electric circuit that is a processor having a circuit configuration dedicatedly designed for executing specific processing, such as an ASIC, and the like, in addition to a CPU that is a general-purpose processor configured to execute software (program) to function as each controller, as described above.

The controller 50 may be configured with one of various processors described above or may be configured with a combination of two or more processors (for example, a combination of a plurality of FPGAs or a combination of a CPU and an FPGA) of the same type or different types. A plurality of controllers may be configured with one processor.

As an example where a plurality of controllers are configured with one processor, first, as represented by a computer, such as a client or a server, there is a form in which one processor is configured with a combination of one or more CPUs and software, and the processor function as a plurality of controllers. Second, as represented by a System On Chip (SOC) or the like, there is a form in which a processor that realizes all functions of a system including a plurality of controllers into one IC chip is used. In this way, the controller 50 can be configured using one or more processors among various processors described as a hardware structure.

As the hardware structure of various processors, more specifically, an electric circuit in which circuit elements, such as semiconductor elements, are combined can be used.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. An imaging apparatus, comprising:
    an imaging optical system that has a light transmission characteristic of transmitting near-infrared light in a near-infrared light wavelength range including 1550 nm;
    an imaging sensor that has sensitivity to heat radiation from a subject and outputs an imaging signal including information regarding a heat radiation image resulting from the heat radiation by imaging the near-infrared light transmitted through the imaging optical system;
    a light source that emits the near-infrared light;
    a light source drive controller that applies temporal modulation to an intensity or a frequency of the near-infrared light emitted from the light source by driving of the light source; and
    an image processor that generates first image data representing a subject image according to the near-infrared light, and second image data representing the heat radiation, based on a direct-current component and a modulated component of the imaging signal,
    wherein the image processor generates the first image data based on the modulated component and generates the second image data based on the direct-current component.

2. The imaging apparatus according to claim 1, wherein the imaging signal includes information regarding both a subject image captured by the near-infrared light and the heat radiation image resulting from the heat radiation.

3. The imaging apparatus according to claim 1, wherein:
    the imaging optical system has a plurality of lenses,
    a coating layer having the light transmission characteristic is formed on at least one lens, and
    the light transmission characteristic has a transmittance peak within the near-infrared light wavelength range.

4. The imaging apparatus according to claim 3, wherein the light transmission characteristic is such that, in the near-infrared light wavelength range, light transmittance on a short wavelength side with respect to a near-infrared light peak wavelength range including 1550 nm decreases from light transmittance at a short wavelength end of the near-infrared light peak wavelength range as a wavelength decreases, and light transmittance on a long wavelength side with respect to the near-infrared light peak wavelength range decreases from light transmittance at a long wavelength end of the near-infrared light peak wavelength range as the wavelength increases.

5. The imaging apparatus according to claim 4, wherein the light transmission characteristic is such that light transmittance in the near-infrared light peak wavelength range is equal to or greater than 60%.

6. The imaging apparatus according to claim 1, wherein the light transmission characteristic is such that a light transmission bandwidth centering on 1550 nm is equal to or less than 200 nm.

7. The imaging apparatus according to claim 6, further comprising:
    a band-pass filter having the light transmission bandwidth,
    wherein the imaging sensor images the near-infrared light transmitted through the imaging optical system and the band-pass filter.

8. The imaging apparatus according to claim 1, wherein the imaging optical system has a zoom function.

9. The imaging apparatus according to claim 1, wherein the imaging sensor is an InGaAs imaging element.

10. The imaging apparatus according to claim 1, further comprising:
    a stop that adjusts an amount of incident light on the imaging sensor.

* * * * *